United States Patent [19]

Someshwar et al.

[11] Patent Number: 4,827,441

[45] Date of Patent: May 2, 1989

[54] BARREL SHIFTER

[75] Inventors: Ashok Someshwar; Bernard Pappert, both of Austin, Tex.

[73] Assignee: Motorola, Inc., Schaumburg, Ill.

[21] Appl. No.: 845,206

[22] Filed: Mar. 27, 1986

[51] Int. Cl.$^4$ .......................... G06F 7/00; G06F 15/00
[52] U.S. Cl. ................................ 364/715.08; 377/64
[58] Field of Search ............... 364/715, 200 MS File, 364/900 MS File; 377/54, 64, 66-70, 73, 75, 77, 81

[56] References Cited

U.S. PATENT DOCUMENTS

| | | | |
|---|---|---|---|
| 4,338,675 | 7/1982 | Palmer et al. | 364/748 |
| 4,387,341 | 6/1983 | Martinson | 377/73 |
| 4,396,994 | 8/1983 | Kang et al. | 364/715 |
| 4,475,173 | 10/1984 | Talmi | 364/715 |
| 4,509,144 | 4/1985 | Palmer et al. | 364/715 |
| 4,583,197 | 4/1986 | Chappell et al. | 364/715 |
| 4,665,538 | 9/1987 | Machida | 364/715 |

OTHER PUBLICATIONS

Mead et al, *Introduction to VLSI Systems*, pp. 157–162, Addison Wesley Publishing Co., 1980.

*Primary Examiner*—Gary V. Harkcom
*Assistant Examiner*—Dale M. Shaw
*Attorney, Agent, or Firm*—Jonathan P. Meyer

[57] ABSTRACT

A barrel shifter comprises a first plurality of bit lines, a second plurality of bit lines and a plurality of switchable interconnections therebetween. A first subset of the switchable interconnections provide each of a set of desired shifts, while a second subset of the switchable interconnections duplicate certain of the first subset thereof and shorten the worst-case path lengths through the shifter. The first and second pluralities of bit lines may comprise interleaved high- and low-order bit lines of two data buses. Interface means may provide the interleaving function and also may provide means for accomplishing at least one shift in addition to the set of desired shifts. Sense amplifiers may be included for sensing voltage transitions on each bit line.

14 Claims, 31 Drawing Sheets

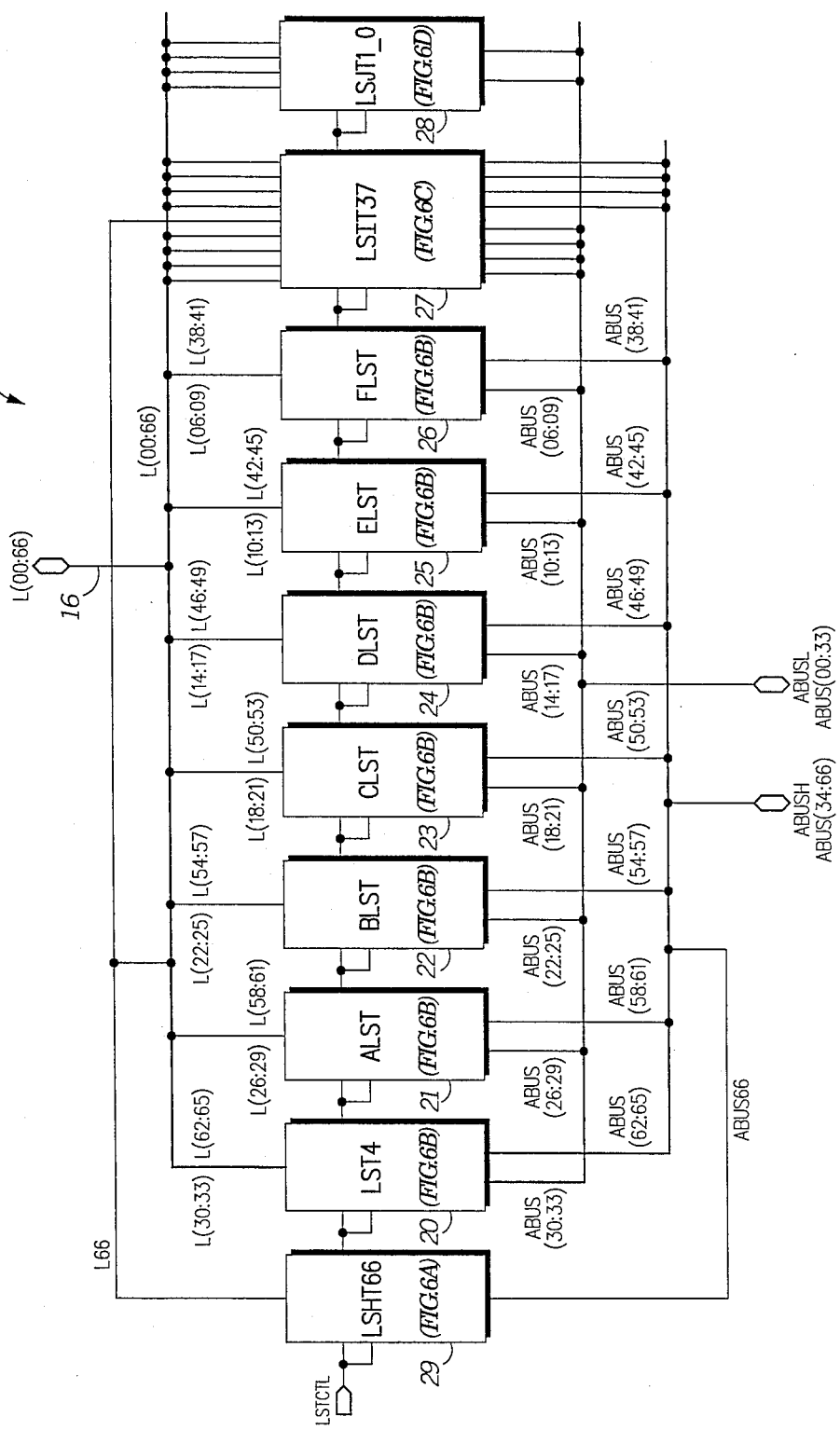

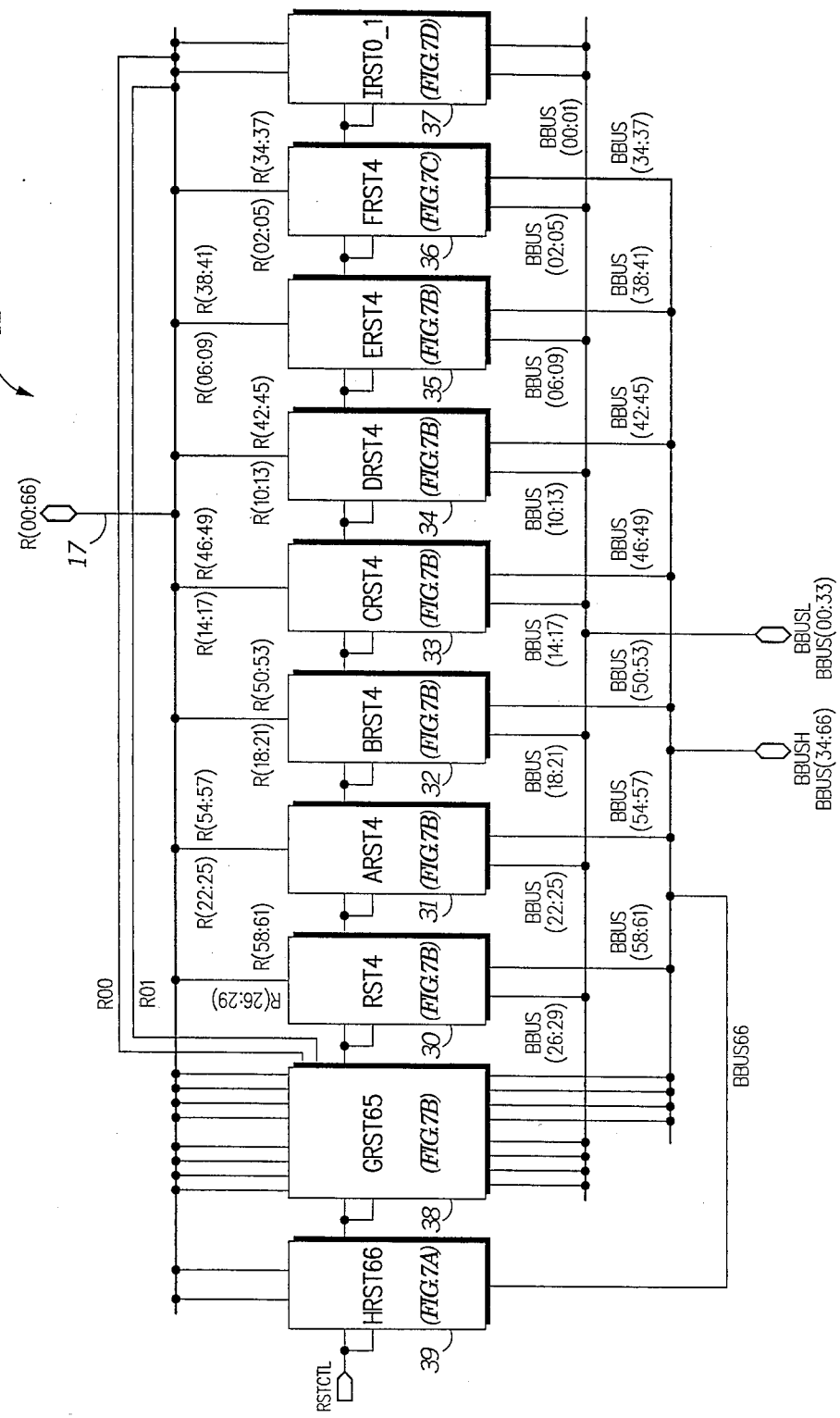

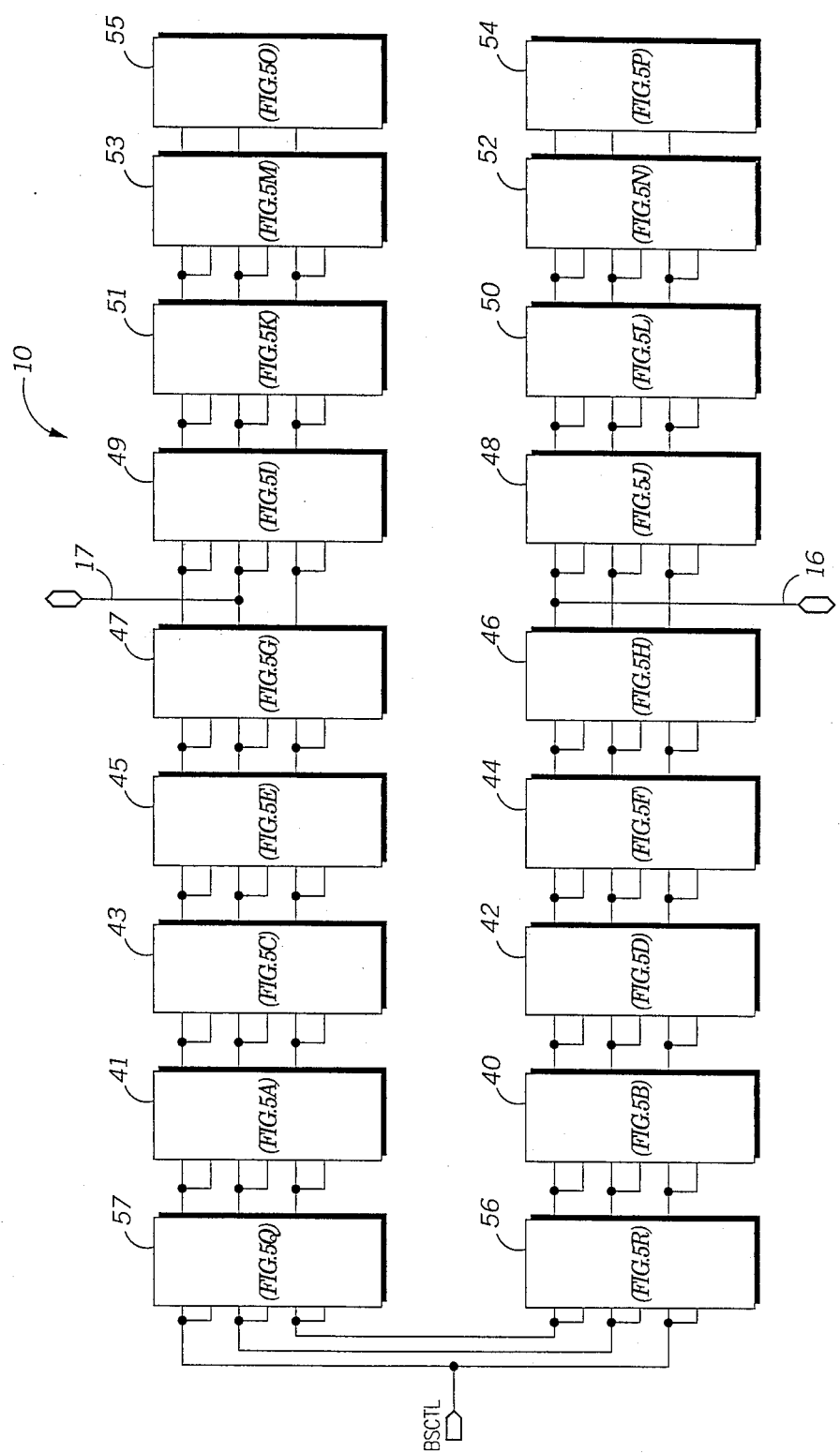

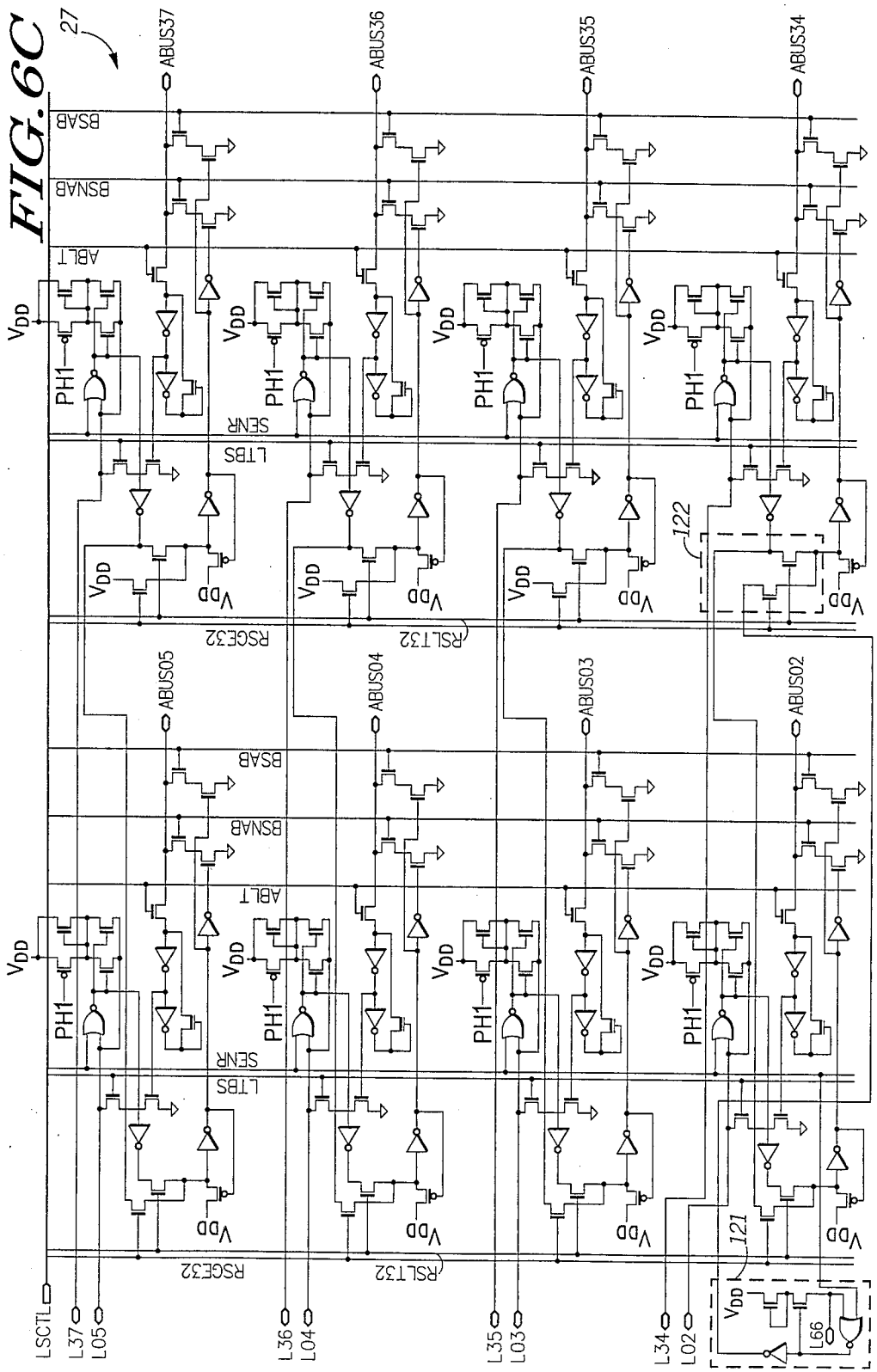

FIG. 7C

BARREL SHIFTER

FIELD OF THE INVENTION

The present invention relates, in general, to a barrel shifter. More particularly, the invention relates to a high speed barrel shifter capable of handling relatively large digital words and performing relatively large shifts thereon.

BACKGROUND OF THE INVENTION

In many digital data processing tasks, the ability to shift a digital word a predetermined number of bits in one direction or another is required. A simple example is the division of a digital data word by two. This is accomplished by a right shift of the bits by one place with a zero filling the vacated most significant bit.

A barrel shifter is a well known logic structure the function of which is to provide the capability of left- or right-shifting digital words by any required amount. Typically, barrel shifters also provide zero-filling, wrap-around and other functions as may be required in the processing system for which the shifter is designed.

The basic architecture of a simple barrel shifter may be thought of as a large array of bit lines with switchable interconnections therebetween. Appropriate selection of the interconnections to be activated provides the required shifts. An example of such a device is disclosed in U.S. Pat. No. 4,338,675. As is apparent, this array, and the resulting signal path lengths, grows rapidly with an increase in the size of the digital words to be handled. This is costly of die area in an integrated circuit implementation. In addition, the increasing capacitive loading of the signal paths results in slower response and/or higher power requirements, both of which are banes of the integrated circuit designer.

SUMMARY OF THE INVENTION

Accordingly, it is an object of the present invention to provide an improved barrel shifter.

A further object of the present invention is to provide a barrel shifter capable of handling large digital words at high speed.

These and other objects and advantages of the present invention are provided by a barrel shifter comprising first and second pluralities of bit lines and first and second pluralities of switchable interconnections therebetween. The first plurality of switchable interconnections is capable of providing all of the desired shifts. The second plurality of switchable interconnections duplicates some of the interconnections in the first plurality and serves to provide shorter paths through the shifter for some of the worst-case paths therethrough. The two pluralities of bit lines may comprise interleaved high- and low-order bit lines. Interface means may be provided to perform the interleaving of the high- and low-order bit lines and to provide means for achieving at least one shift in addition to the set of shifts provided by the switchable interconnections. In addition, sense amplifiers are advantageously provided for each bit line to provide very rapid resolution of the shift array.

These and other objects and advantages of the present invention will be apparent to one skilled in the art from the detailed description below taken together with the drawings.

BRIEF DESCRIPTION OF THE DRAWINGS

FIG. 1A is a diagram illustrating the interleaved bit lines of FIG. 1;

FIG. 2 is a block diagram of a left shift input and right shift output section of the barrel shifter of FIG. 1;

FIG. 3 is a block diagram of the right shift input and left shift output section of the barrel shifter of FIG. 1;

FIG. 4 is a block diagram of the shift array section of the barrel shifter of FIG. 1;

FIGS. 6A–6D are detailed schematic diagrams illustrating the electrical structure of the left shift input and right shift output section of the barrel shifter of FIG. 1; and FIGS. 7A–7D are detailed schematic diagrams illustrating the electrical structure of the right shift input and left shift output section of the barrel shifter of FIG. 1.

DETAILED DESCRIPTION OF A PARTICULAR EMBODIMENT

The present invention is described below with respect to a particular embodiment thereof. The particular embodiment is a 67-bit barrel shifter capable of performing left and right shifts of 66 bits in one clock cycle. Of course, greater shifts may be accomplished by the same apparatus with the result being an all-zero output. Left shifts are accompanied by zero-filling of the least significant bits and right shifts are accompanied by zero-filling of the most significant bits. In addition, a sign-extend function is available on right shifts to fill the most significant bits with bits equivalent to the most significant (sign) bit of the input. In the particular embodiment, a 16.67 MHz or higher clock is anticipated, which corresponds to a period of approximately 60 nanoseconds or less available for each shift. In the particular embodiment, 30 nanoseconds are used to load the input data, input and decode the shift count, and other I/O functions. This leaves only 30 nanoseconds in which to actually perform the shift. It is not intended that the detailed description of this particular embodiment be interpreted as limiting the scope of the present invention, which is set forth in the appended claims.

Figure 1:
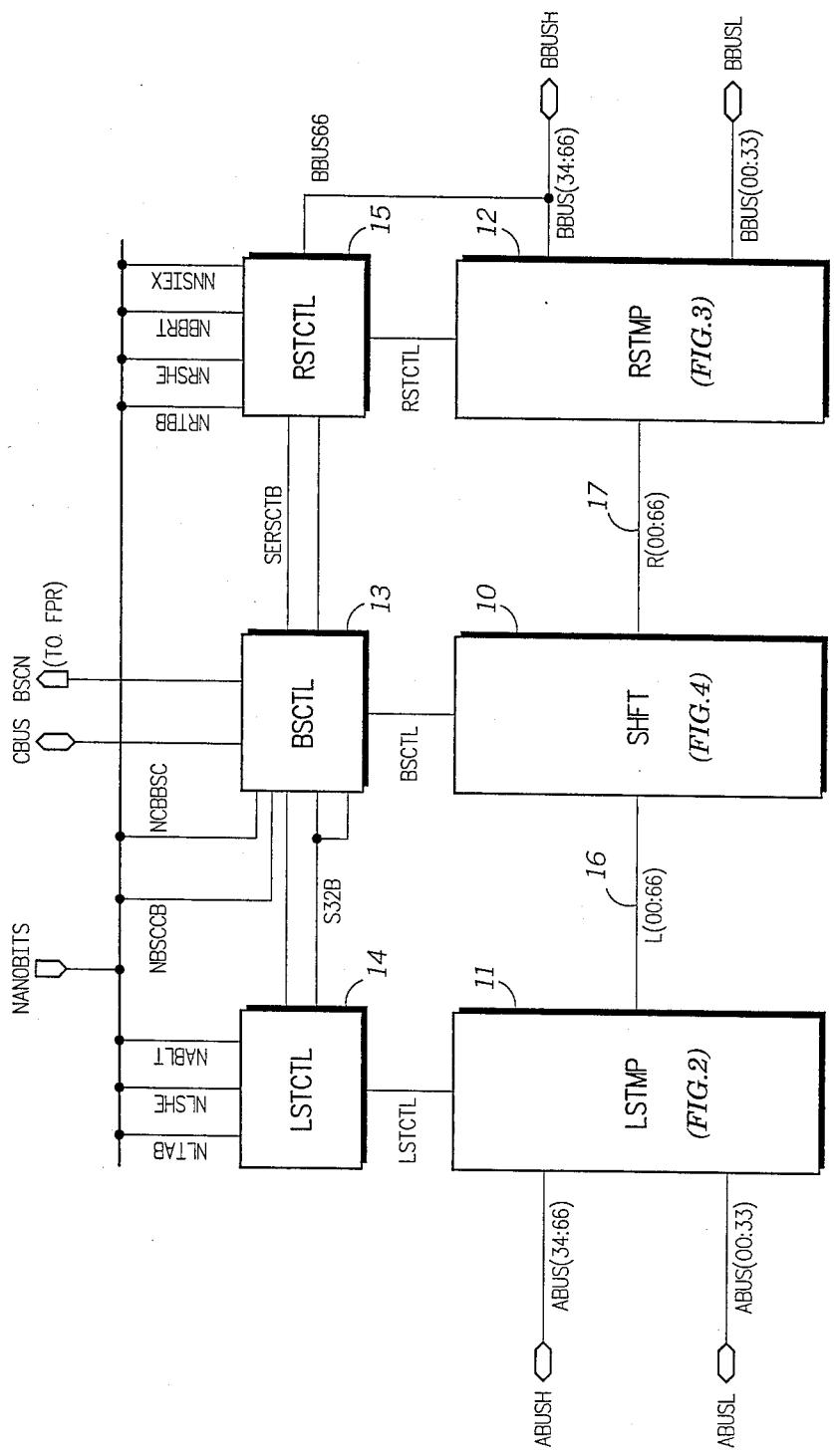
FIG. 1 is a block diagram of a barrel shifter according to a particular embodiment of the present invention.

FIG. 1 is a block diagram illustrating the basic functional units of the barrel shifter of the particular embodiment. A shift array portion 10 comprises a large array of bit lines and switch paths therebetween. Shift array 10 actually performs most of the shift functions available from the barrel shifter. A left shift input and right shift output (LSTMP) section 11 and a right shift input and left shift output (RSTMP) section 12 are coupled to shifter array 10. LSTMP section 11 is coupled to the high and low halves of a first data bus referred to as ABUS (ABUSH and ABUSL, respectively). ABUSH carries bits 34–66 (the high-order bits) and ABUSL carries bits 00–33 (the low-order bits) of the 67-bit data word. Similarly, RSTMP section 12 is coupled to the upper and lower halves of a second data bus BBUS (BBUSH and BBUSL, respectively).

On right shifts, data is input to RSTMP 12 via BBUS and is output via LSTMP 11 to ABUS. On left shifts, data is input to LSTMP 11 via ABUS and is output to BBUS via RSTMP 12. Data transfer between LSTMP 11 and shift array 10 is accomplished via an interleaved left bus, L, 16. A designation of L32 refers to the bit line of L bus 16 which carries bit number 32. Similarly, an interleaved right bus, R, 17 carries data between RSTMP 12 and shift array 10 and R13 refers to the bit line of R bus 17 carrying bit number 13.

Figure 1A:
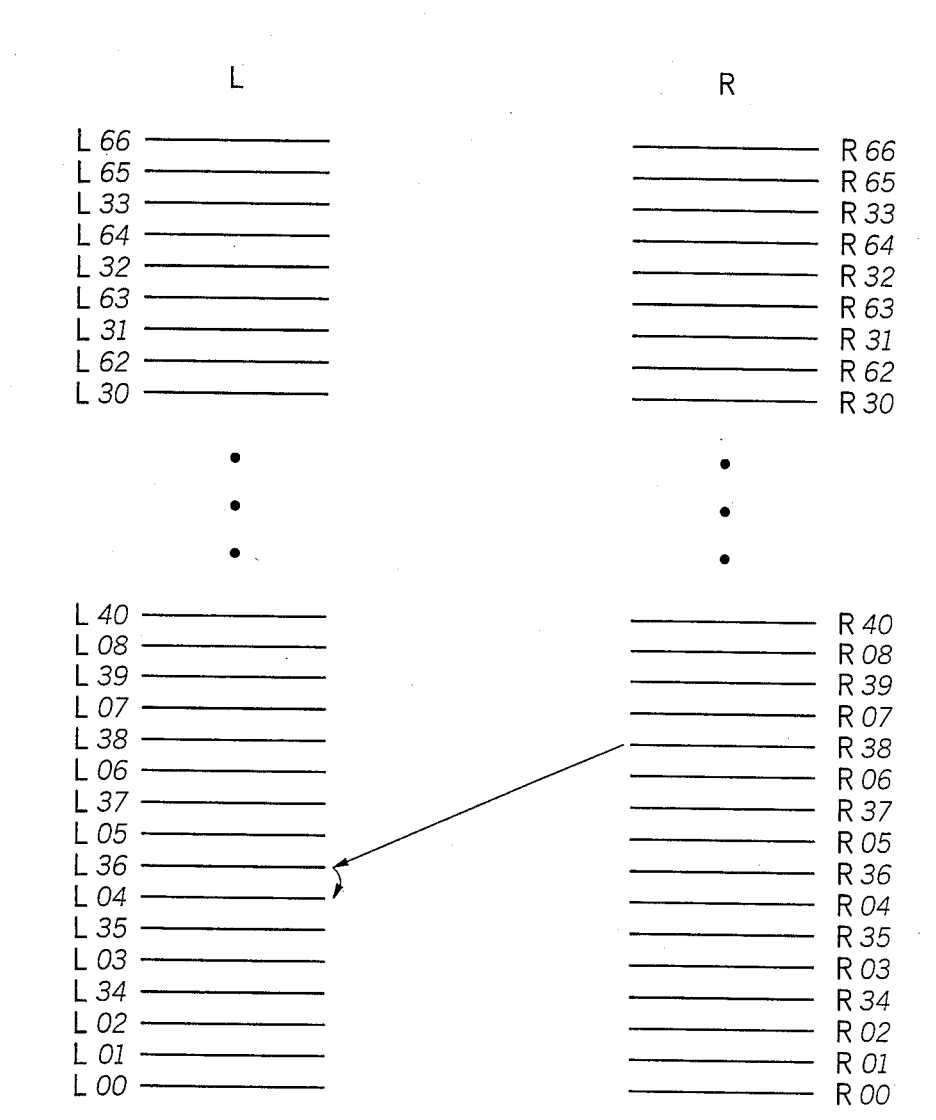

FIG. 1A illustrates the order in which the high- and low-order bit lines are interleaved in the particular embodiment. On both L bus 16 and R bus 17, bit lines 00 and 01 are adjacent, followed by bit line 02, then bit line 34, then bit line 03, and so on. Following a single bit through an exemplary shift illustrates the basic operation of the apparatus. Consider, for instance, a right shift of 34 bits and its effect on input bit 38. As described above, right shift inputs are via RSTMP 12, so input bit 38 is on bit line R38. First, a right shift of 2 places is carried out by making a connection between R38 and L36, as shown in FIG. 1A. Next, a further right shift of 32 places is accomplished by making a connection between L36 and L04. This latter connection is particularly simple because of the juxtaposition of lines L36 and L04 as a result of interleaving. As will be more apparent from the description of FIGS. 6A-6D and 7A-7D, below, the 32-bit shift is actually accomplished, in the preferred embodiment, by connecting L36 to ABUS04.

In this particular embodiment, shift array 10 provides only those interconnections necessary to implement shifts of 31 places or less, except for some special cases. The additional shifts of 32 places are implemented in LSTMP 11 and RSTMP 12 by the simple expedient of selecting between two adjacent destination lines on ABUS or BBUS. As is apparent, this would leave shifts of 64, 65 and 66 places unattainable, since 31 plus 32 equals only 63. Therefore, special accomodation is made for shifts of 64, 65 and 66 places.

The control structure of this barrel shifter comprises a barrel shift controller (BSCTL) 13, a controller 14 for LSTMP 11 (LSTCTL) and a controller 15 for RSTMP 12 (RSTCTL). Controllers 13, 14 and 15 receive instructions, the details of which are not important for present purposes, indicating whether a left or a right shift is to be performed, the shift count (number of bits right or left) and an indication of whether the sign extend function is to be implemented, among others. Controllers 13, 14 and 15 then apply appropriate control signals to shift array 10, LSTMP 11 and RSTMP 12 to accomplish the desired shift operation. The content of these control signals and their meaning are discussed further below. It should be noted that bit line BBUS66 is input to RSTCTL 15. Therefore, on right shifts in which the sign extend function has been invoked RSTCTL 15 can determine the value of the sign bit (bit 66) of the input word to determine whether a one's fill should be substituted for the normal zero fill.

FIG. 2 is a more detailed block diagram illustrating the structure of LSTMP 11 of FIG. 1. Functionally, LSTMP 11 may be described as comprising seven identical functional blocks 20, 21, 22, 23, 24, 25 and 26 and three unique functional blocks 27, 28 and 29. The internal details of each of these functional blocks is described below with reference to FIGS. 6A-6D. Each of the functional blocks 20-29 is coupled to one or more bit lines of ABUS, one or more bit lines of L bus 16 and control lines from LSTCTL 14. As noted above, LSTMP 11 serves as an input interface to shift array 10 on left shifts and as an output interface from shift array 10 on right shifts.

Functional blocks 20-29 serve to interleave the lines of ABUSH and ABUSL onto L bus 16 (and vice versa). In addition, sense amplifiers necessary to sense signals on L bus 16 are included in functional blocks 20-29. Right shifts of 32 bits are accomplished within LSTMP 11 by means of a high-low selection, as will be more apparent from the description below. Finally, a negate function which is useful when the sign extend function is invoked is implemented in LSTMP 11.

FIG. 3 is a more detailed block diagram illustrating the structure of RSTMP 12 of FIG. 1. Functionally, RSTMP 12 may be described as comprising seven identical functional blocks 30, 31, 32, 33, 34, 35 and 36 and three unique functional blocks 37, 38 and 39. The internal details of each of these functional blocks is described below with reference to FIGS. 7A-7D. Each of the functional blocks 30-39 is coupled to one or more bit lines of BBUS, one or more bit lines of R bus 17 and control lines from RSTCTL 15. As noted above, RSTMP 12 serves as an input interface to shift array 10 on right shifts and as an output interface from shift array 10 on left shifts.

Functional blocks 30-39 serve to interleave the lines of BBUSH and BBUSL onto R bus 17 (and vice versa). In addition, sense amplifiers necessary to sense signals on R bus 17 are included in functional blocks 30-39. Right shifts of 32 bits are accomplished within RSTMP 12 by means of a high-low selection, as will be more apparent from the description below.

FIG. 4 is a more detailed block diagram illustrating the electrical structure of shift array 10 of FIG. 1. FIG. 4 is not intended to indicate the physical layout of shift array 10, nor are FIGS. 5A-5R, which illustrate the details of shift array 10. Functionally, shift array 10 may be described as comprising eighteen functional blocks 40-57. Each functional block 40-57 is coupled to at least some bit lines from each of L bus 16 and R bus 17 and to shift count control lines from BSCTL 13.

The control signals from BSCTL 13 to shift array 10 comprise the shift count signals S00-S31, S64, S65 and S66. These signals specify, respectively, shifts of 0-31 places, 64 places, 65 places and 66 places. Each control signal causes shift array 10 to make appropriate interconnections for both left and right shifts of the specified count. Which shift is actually implemented is controlled by LSTMP 11 and RSTMP 12.

As is apparent from FIG. 4, functional blocks 56 and 57 are somewhat different from the remainder of the functional blocks. Functional blocks 40-55 comprise the array of bit lines and switchable interconnections therebetween necessary to implement each of the desired shift functions S00-S31, S64, S65 and S66. Functional blocks 56 and 57 comprise an additional bit line and interconnections which are necessary to shorten the path lengths experienced in the "worst-case" shift. That is, functional blocks 56 and 57 duplicate certain of the interconnections of functional blocks 40-55 in order to provide faster operation of shift array 10.

It has been found that duplication of bit line R34 and its interconnections at the top of the array provides the necessary shortening of worst-case path lengths. Certain other adjustments must be made in LSTMP 11 and RSTMP 12 in order to effectively implement the fast 32-bit shifts described above in all possible cases. For instance, a left shift of greater than 32, which involves the transfer of a bit from R34 to R66 in RSTMP 12, requires special consideration in the design of RSTMP 12 to ensure rapid execution. These details will be more clear from the following description of FIGS. 5, 6 and 7.

Figure 5A:
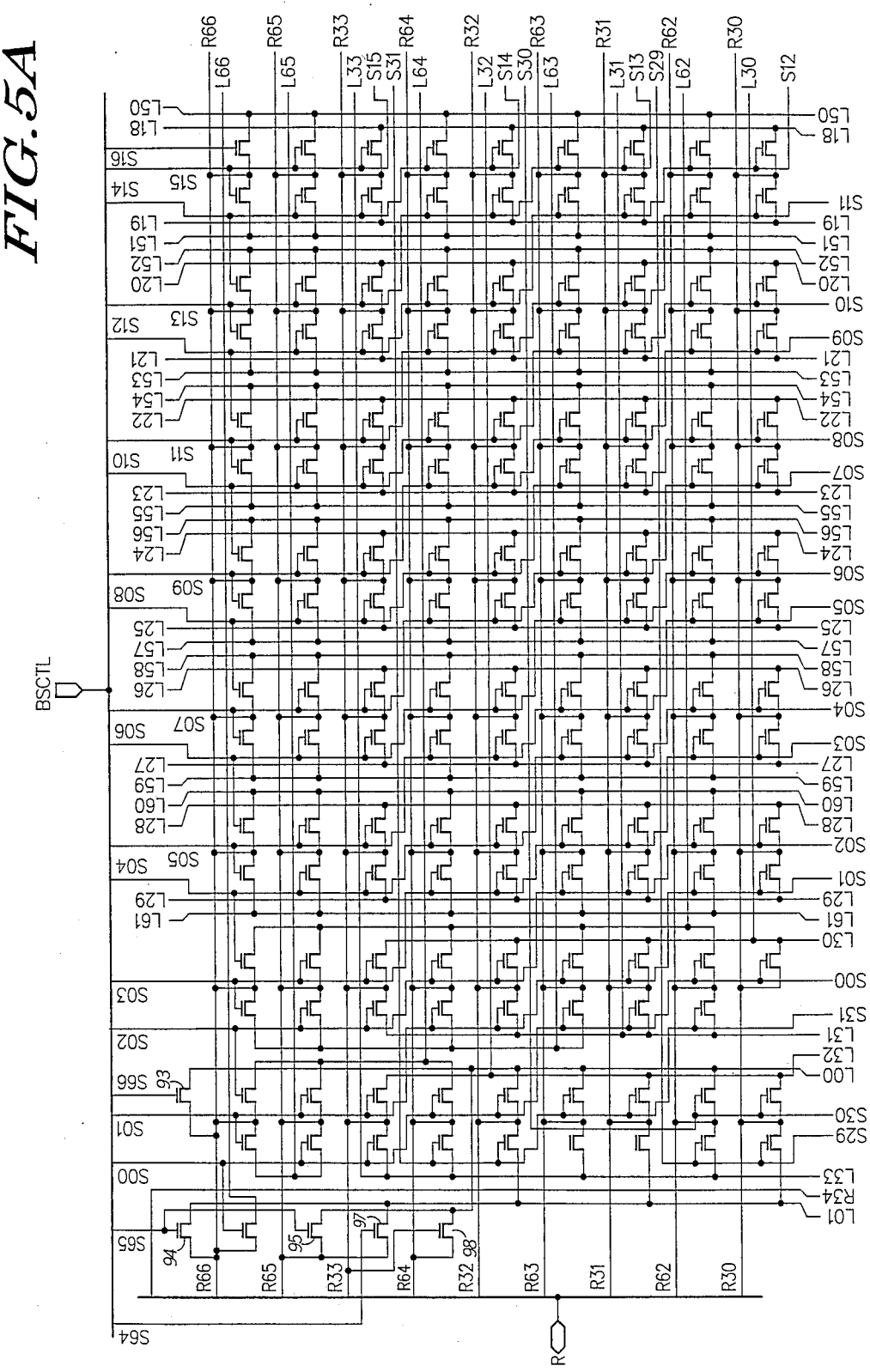
FIGS. 5A–5R are detailed schematic diagrams illustrating the electrical structure of the shift array section of the barrel shifter of FIG. 1.
Figure 5B:
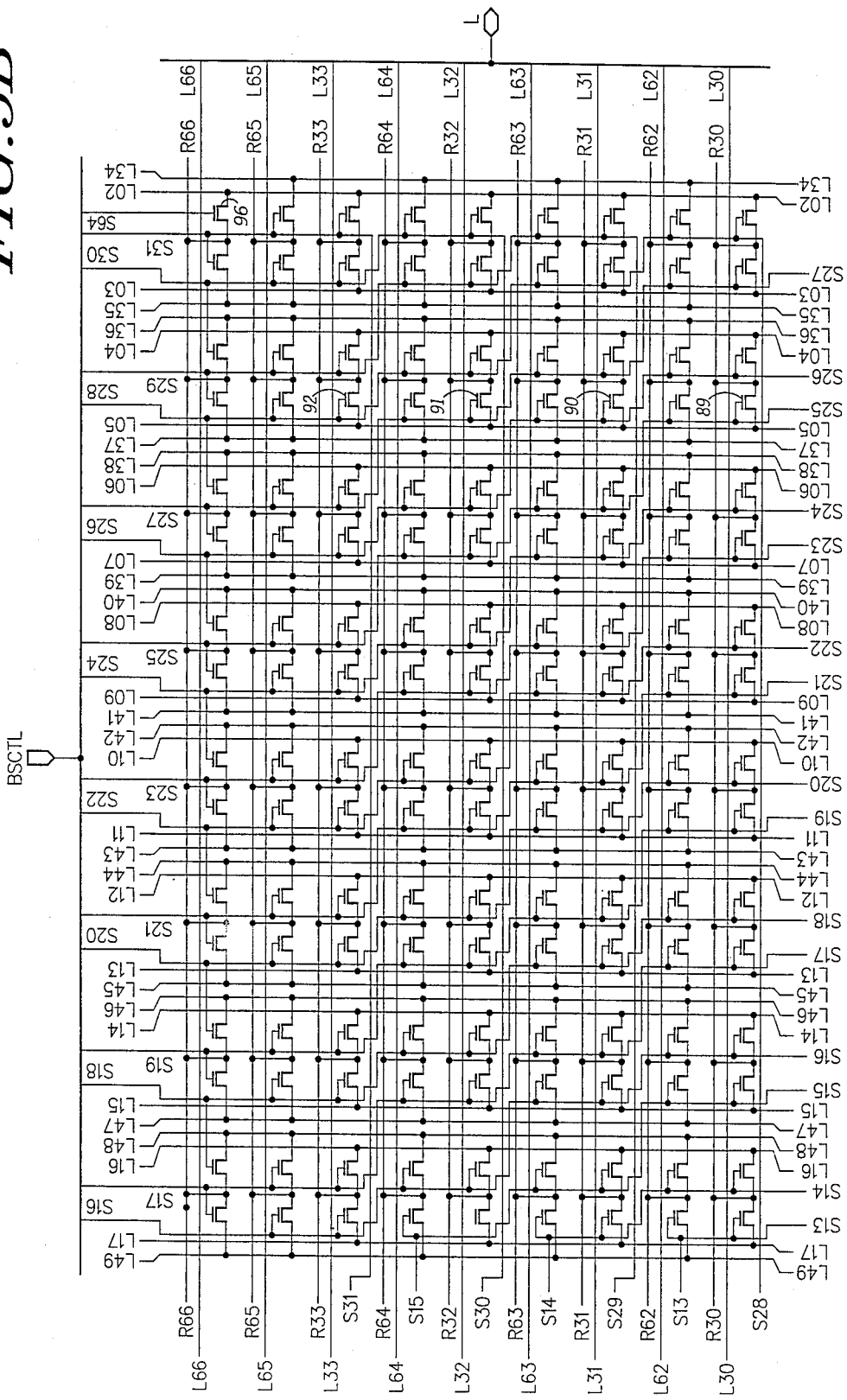
Figure 5C:
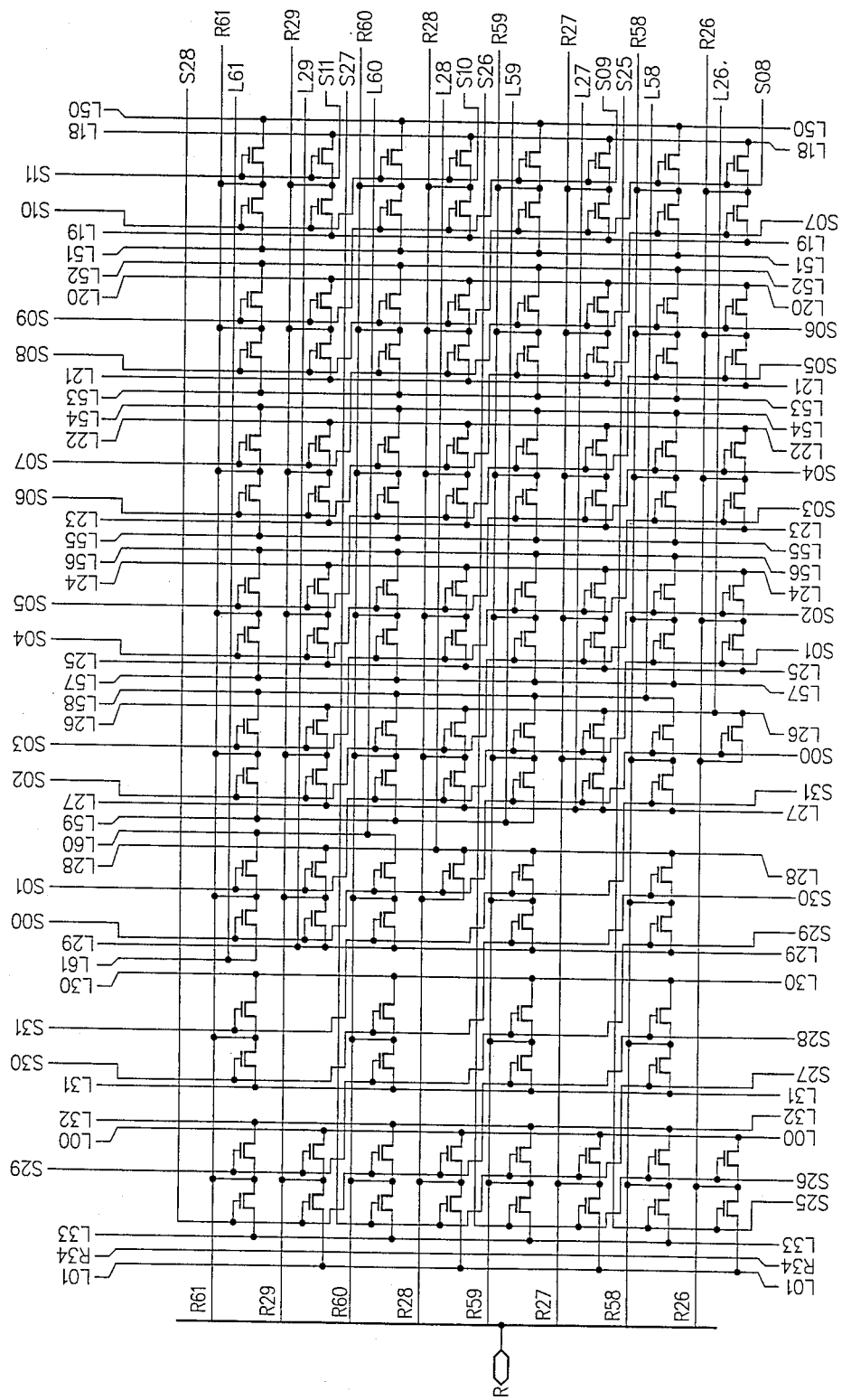
Figure 5D:
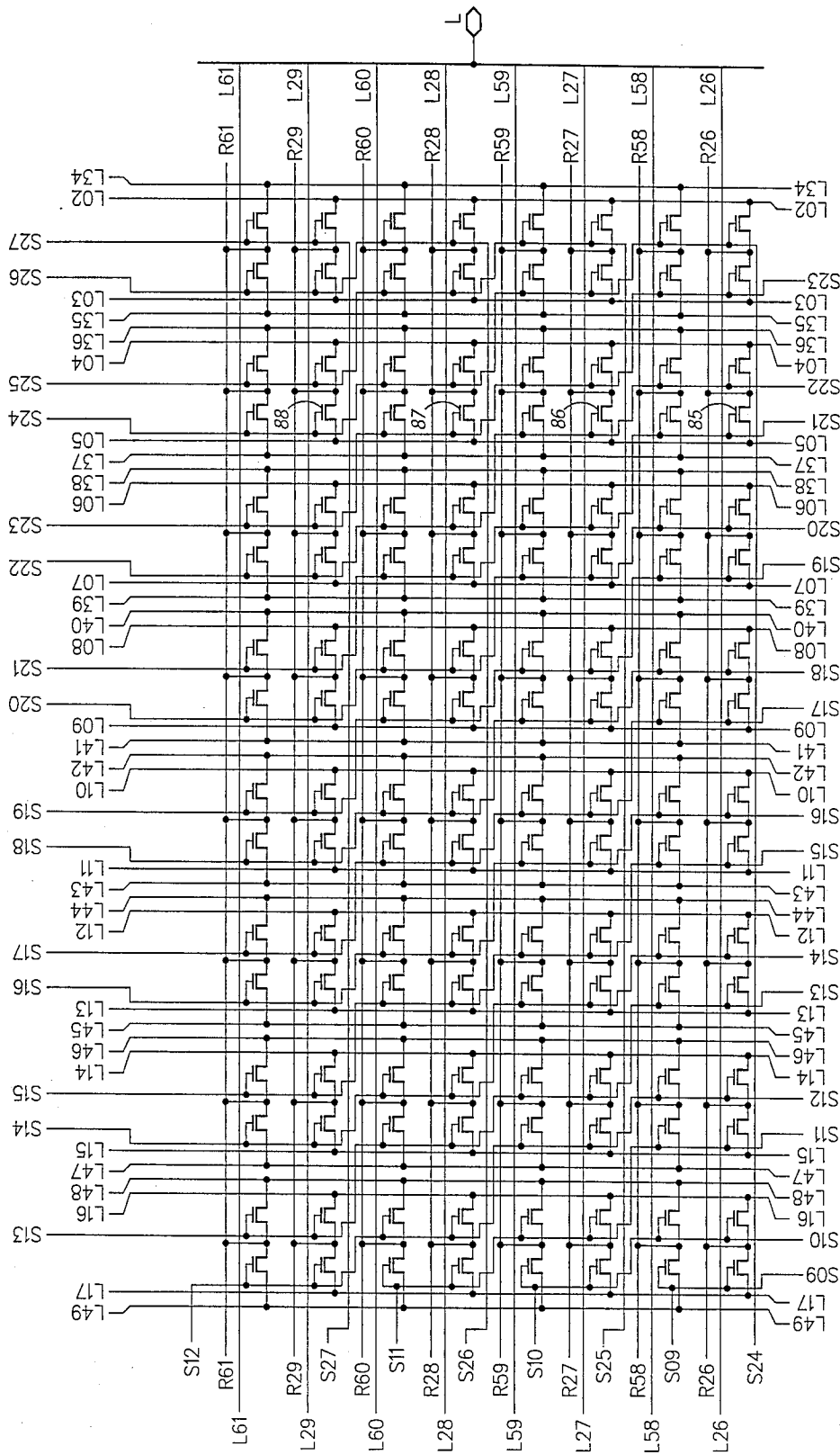
Figure 5E:
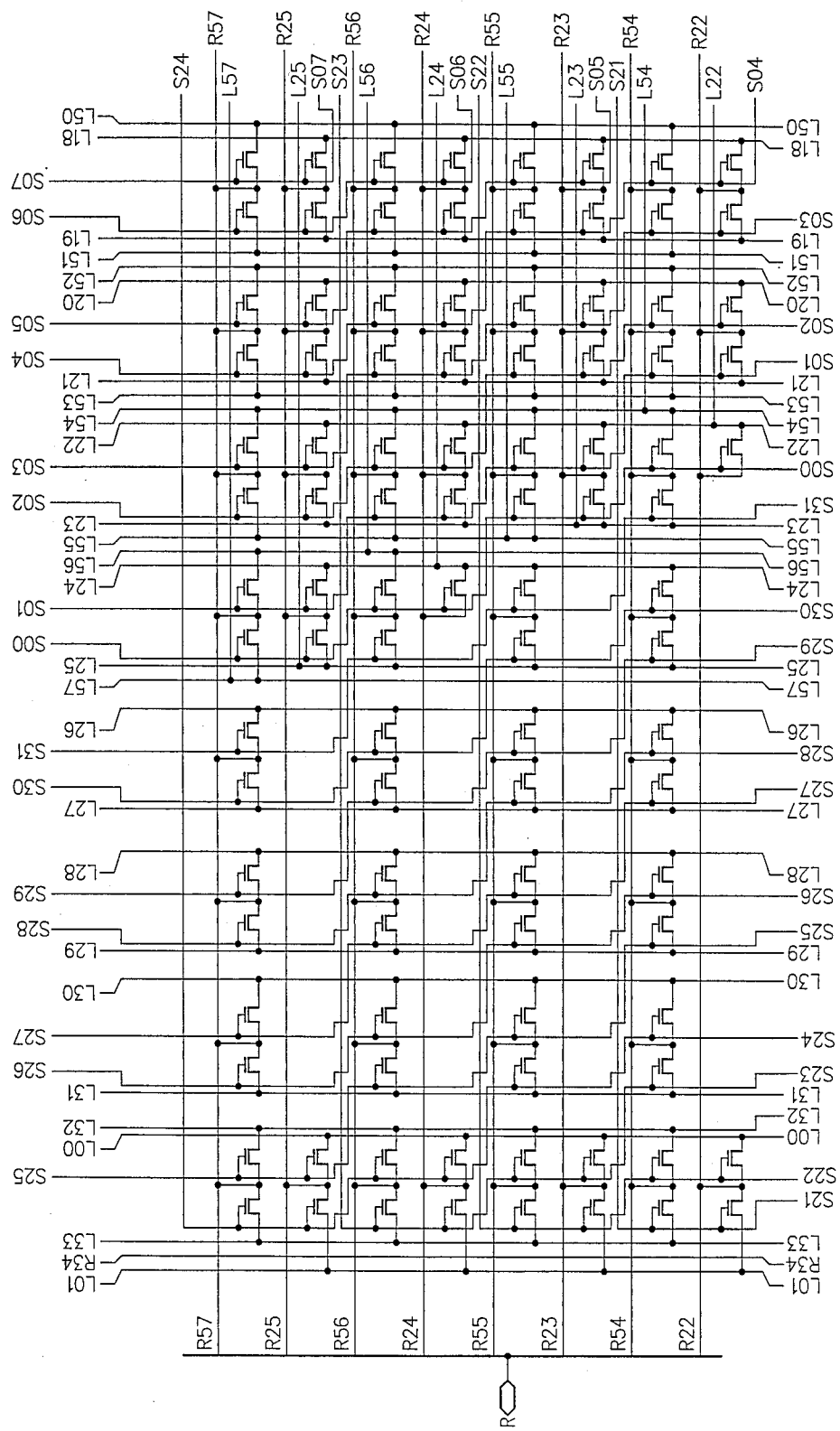
Figure 5F:
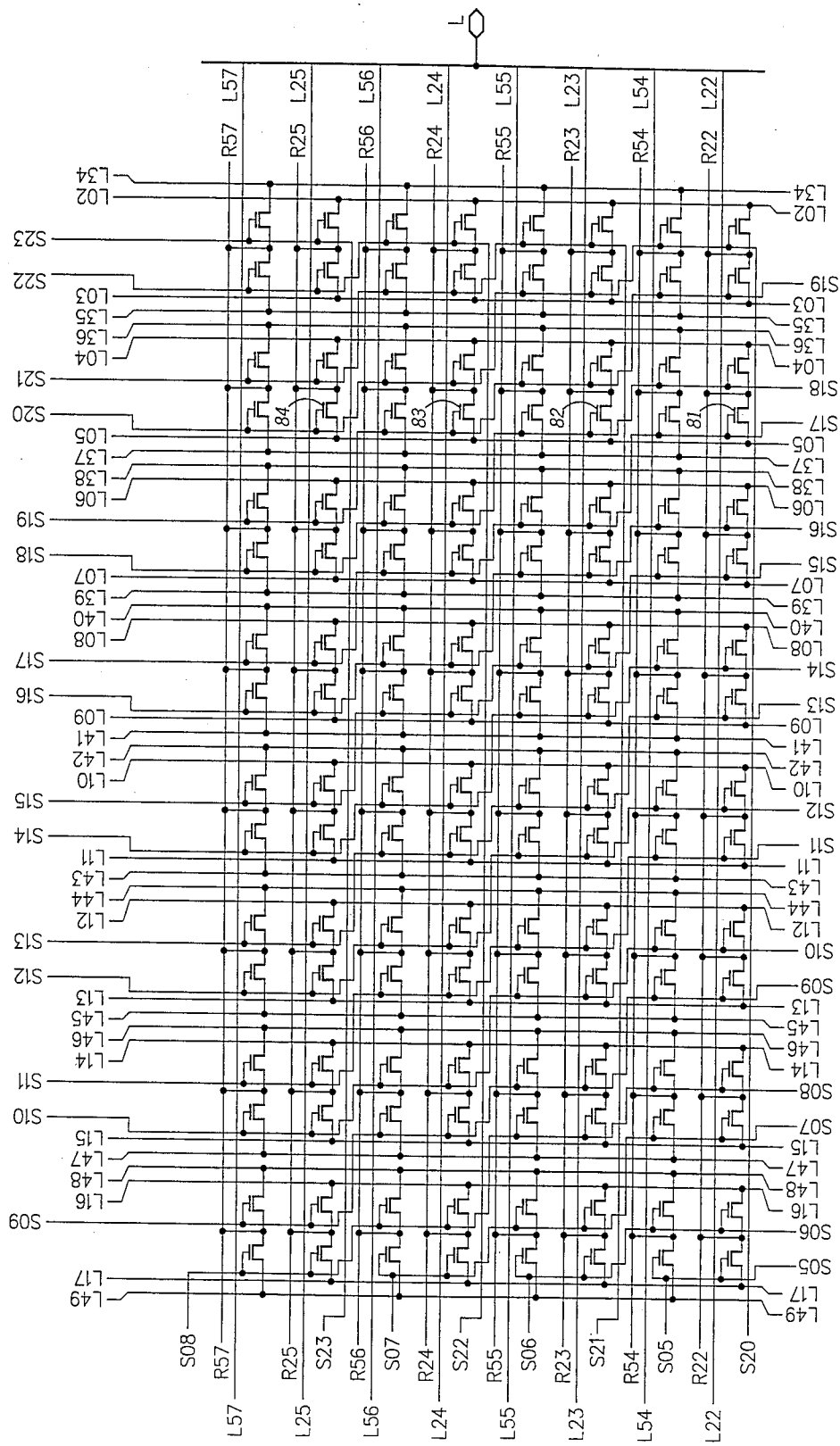
Figure 5G:
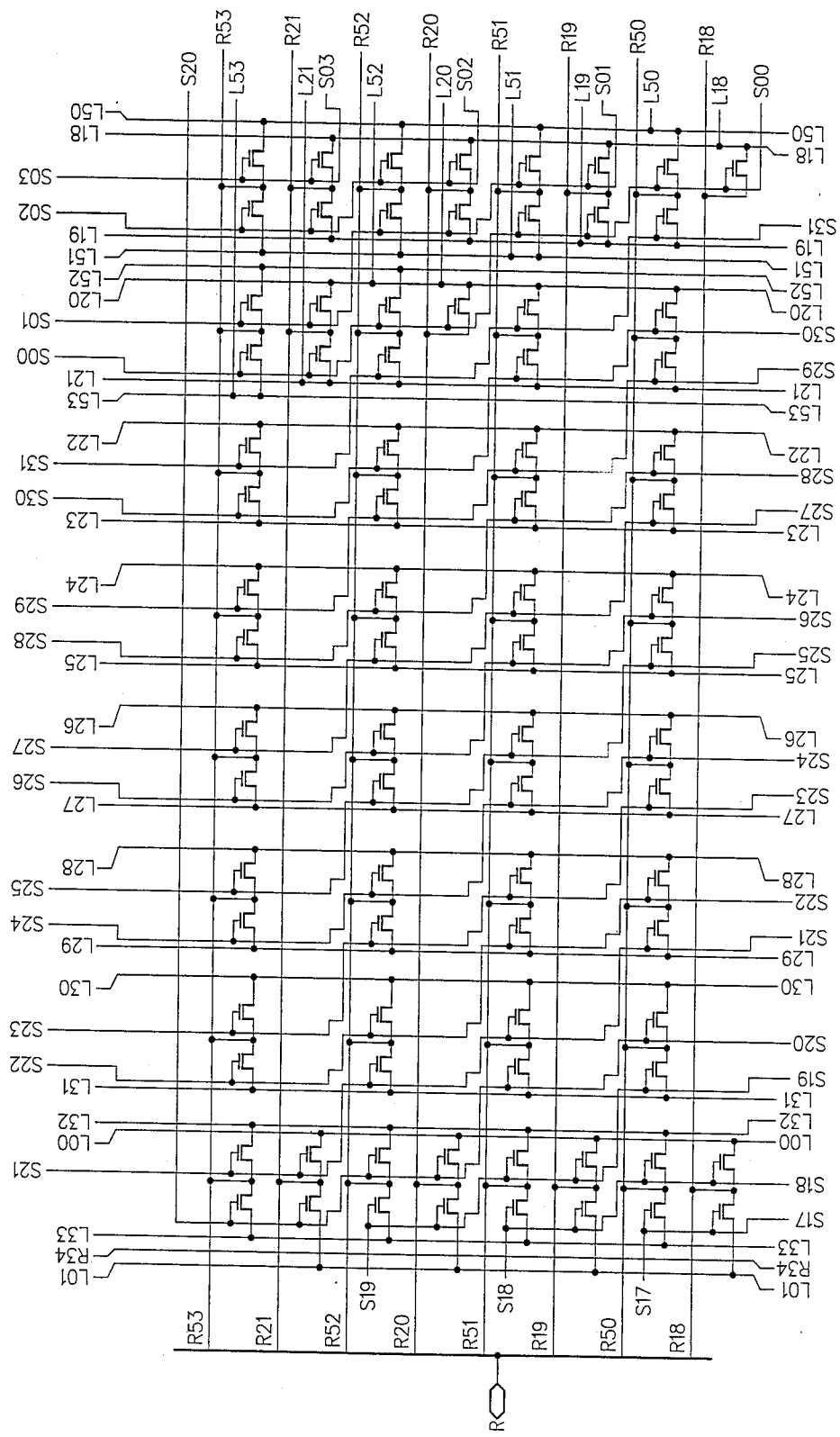
Figure 5H:
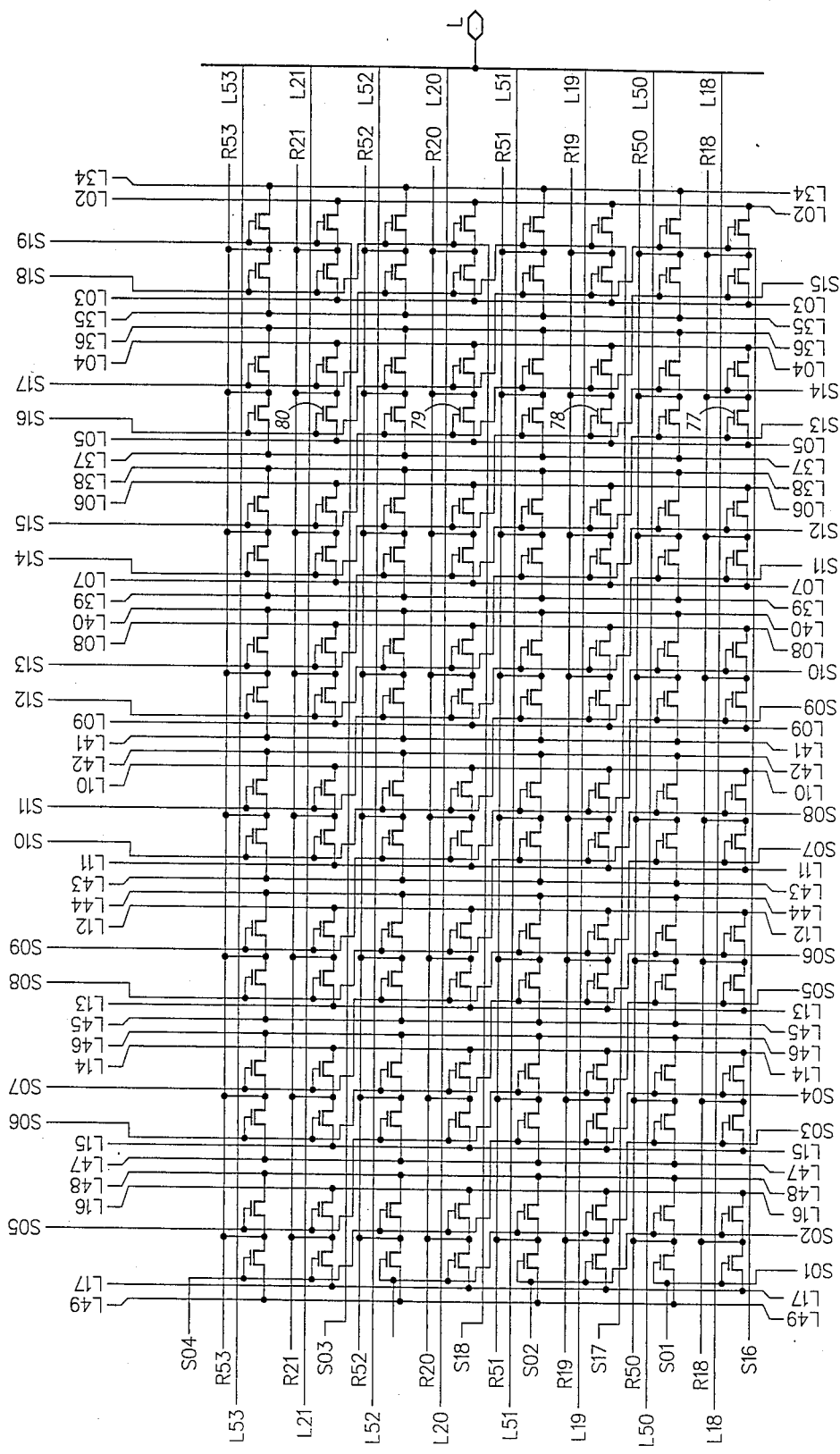
Figure 5I:
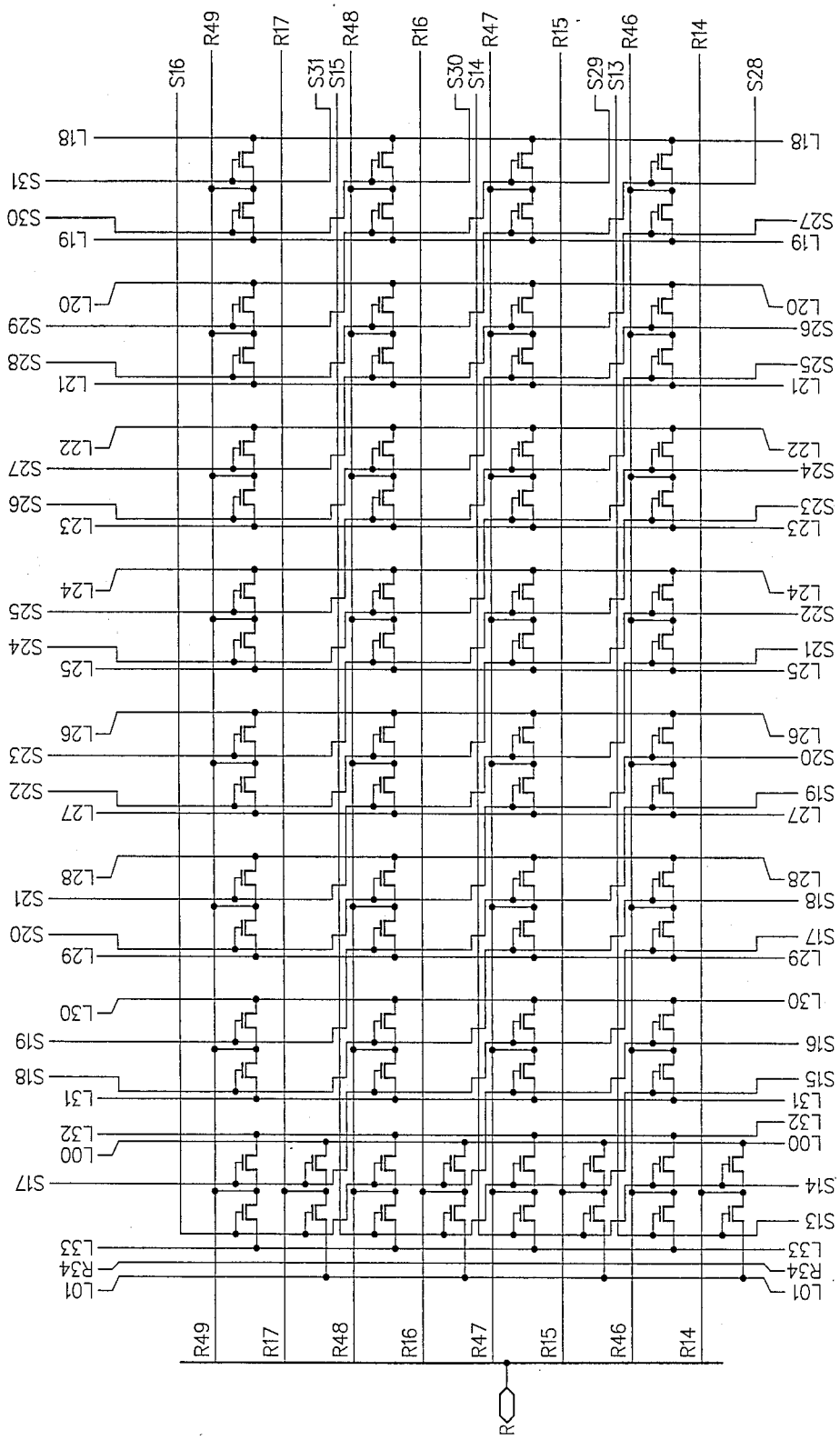
Figure 5J:
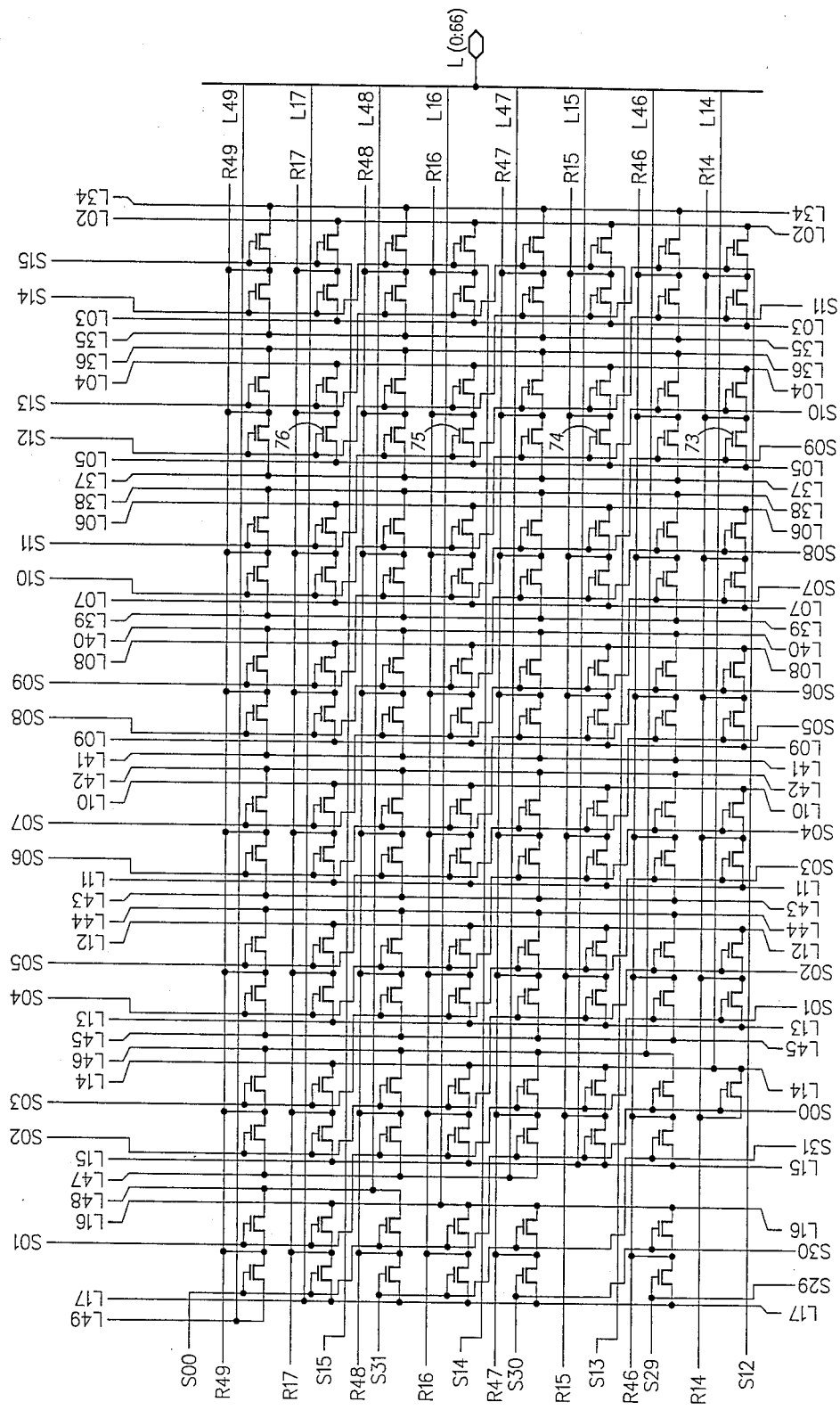
Figure 5K:
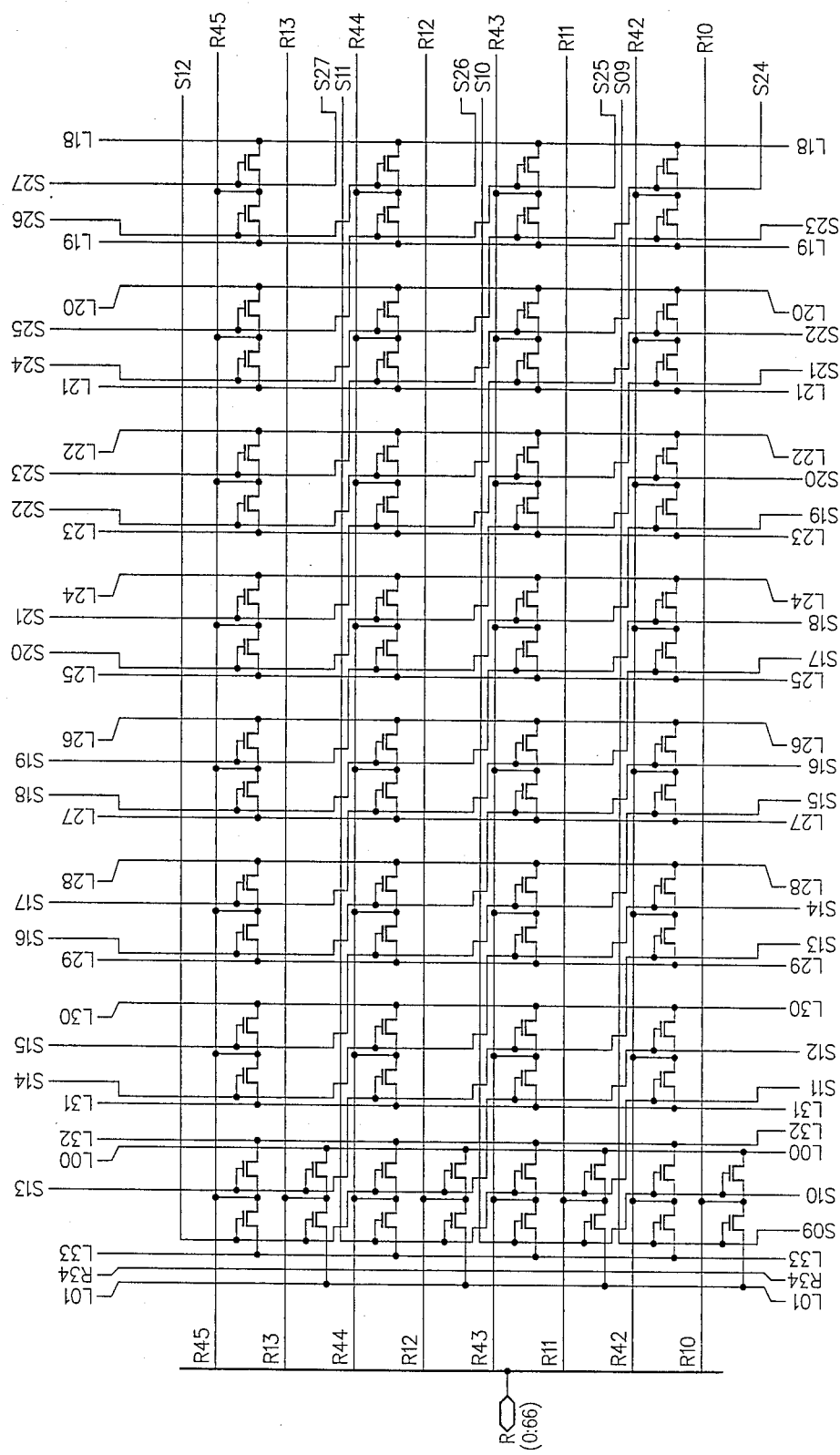
Figure 5L:
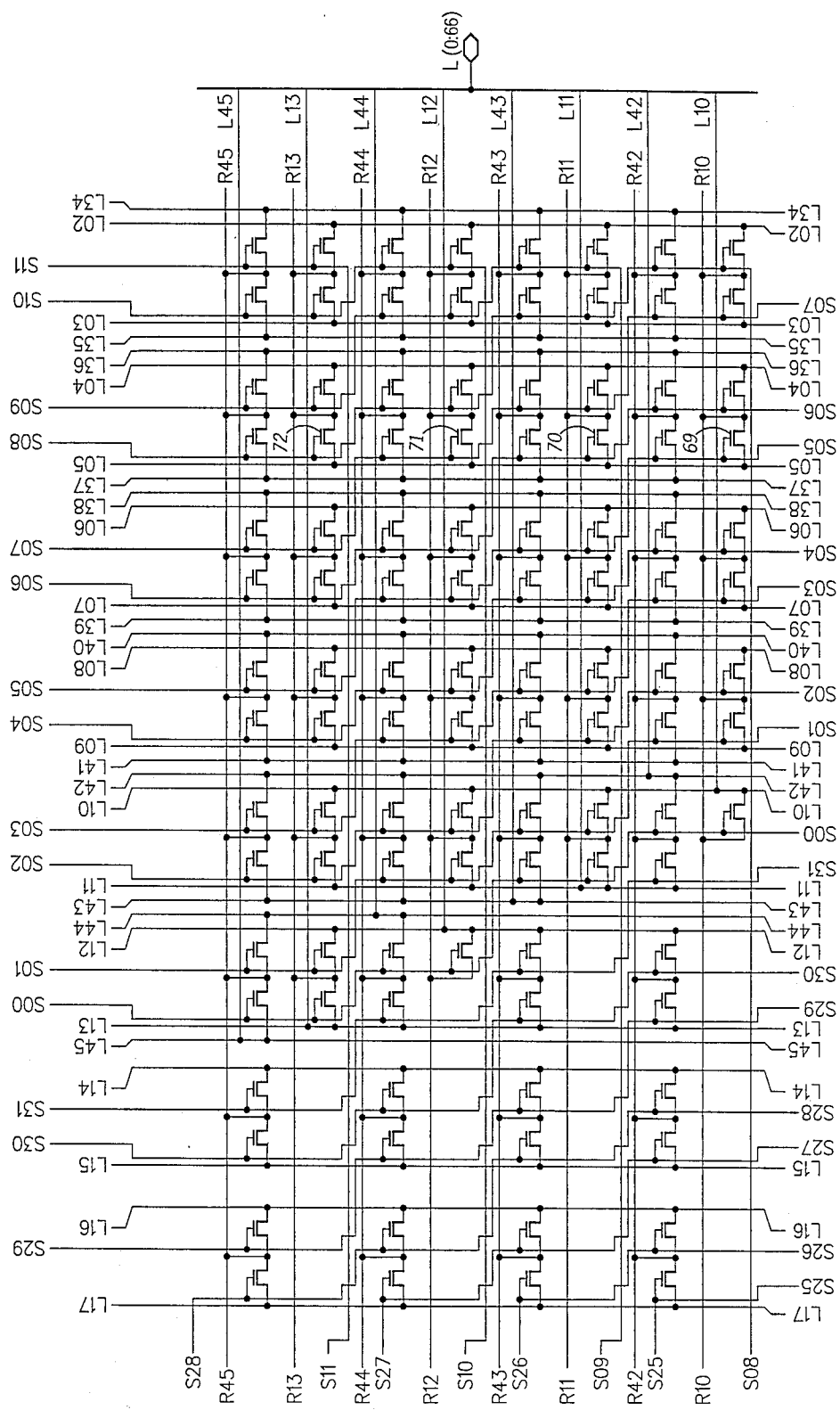
Figure 5M:
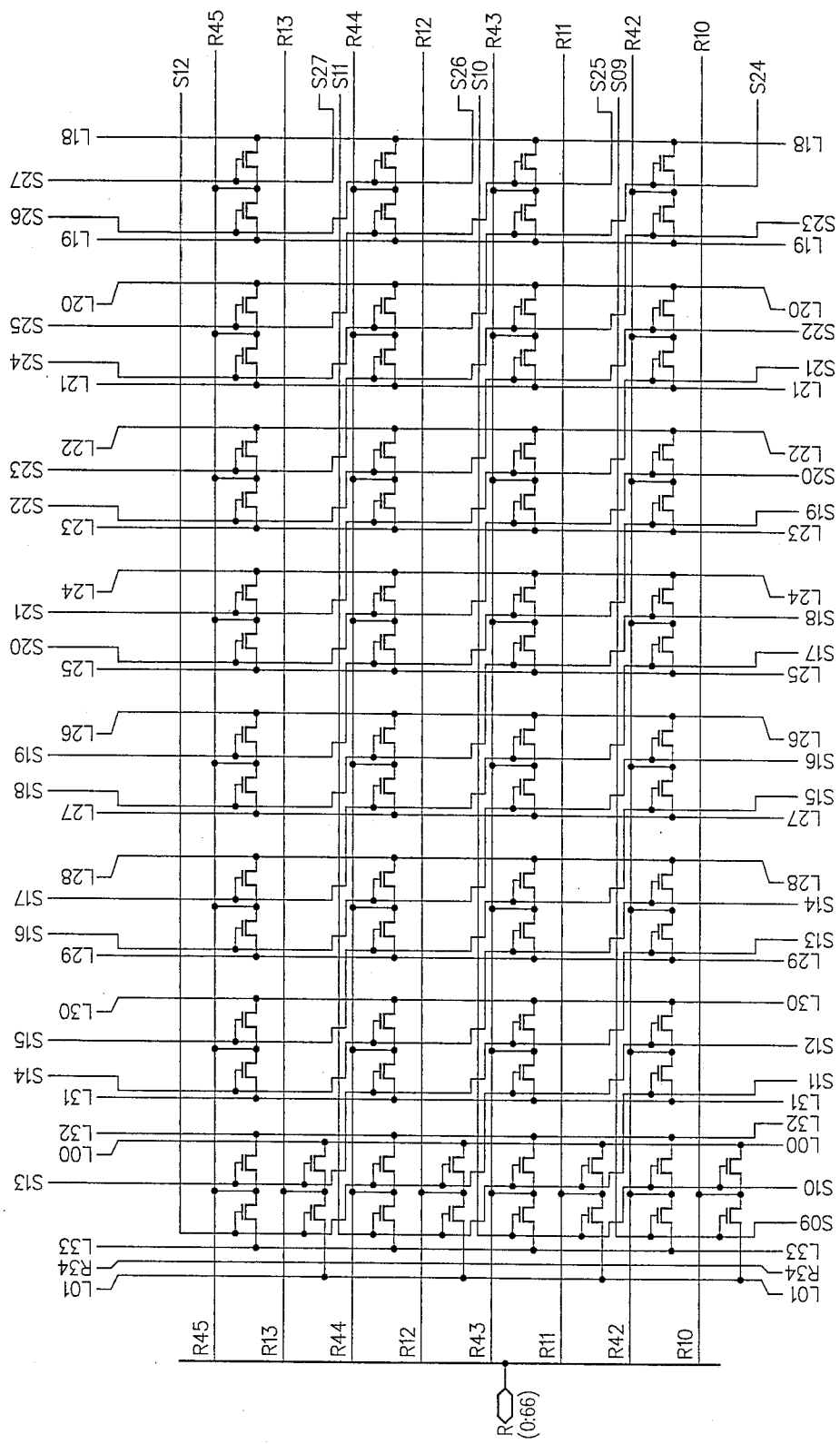
Figure 5N:
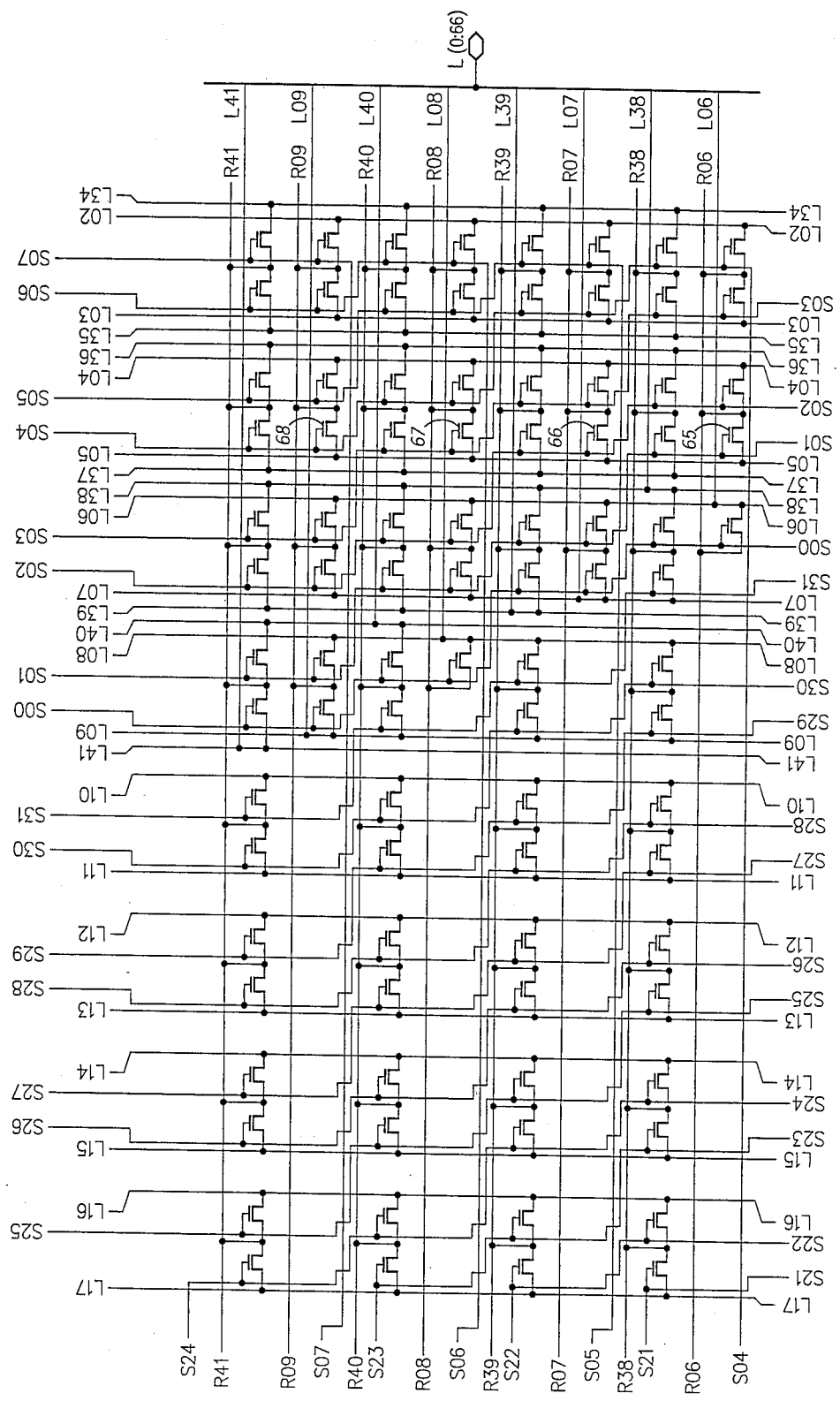
Figure 50:
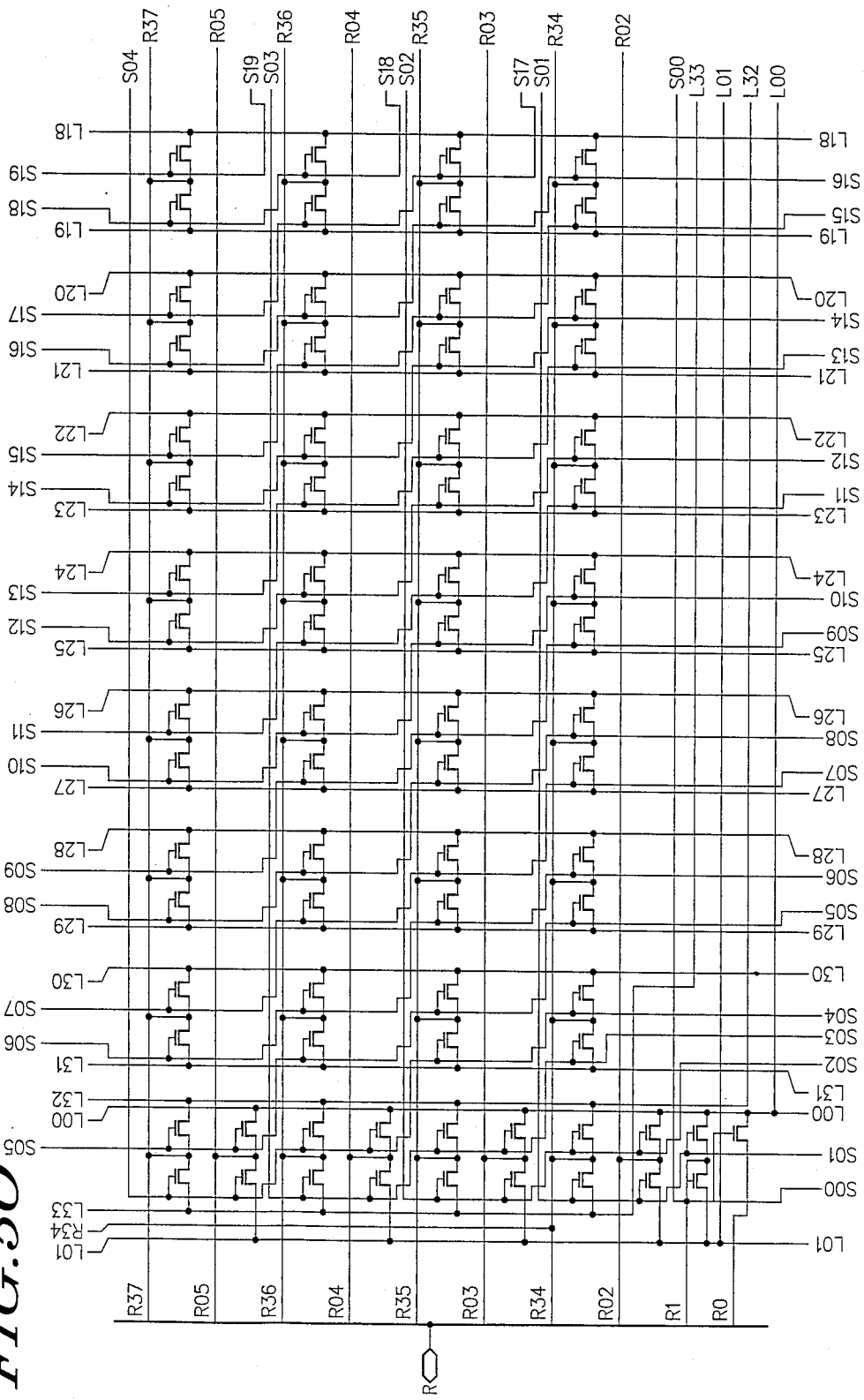
Figure 5P:
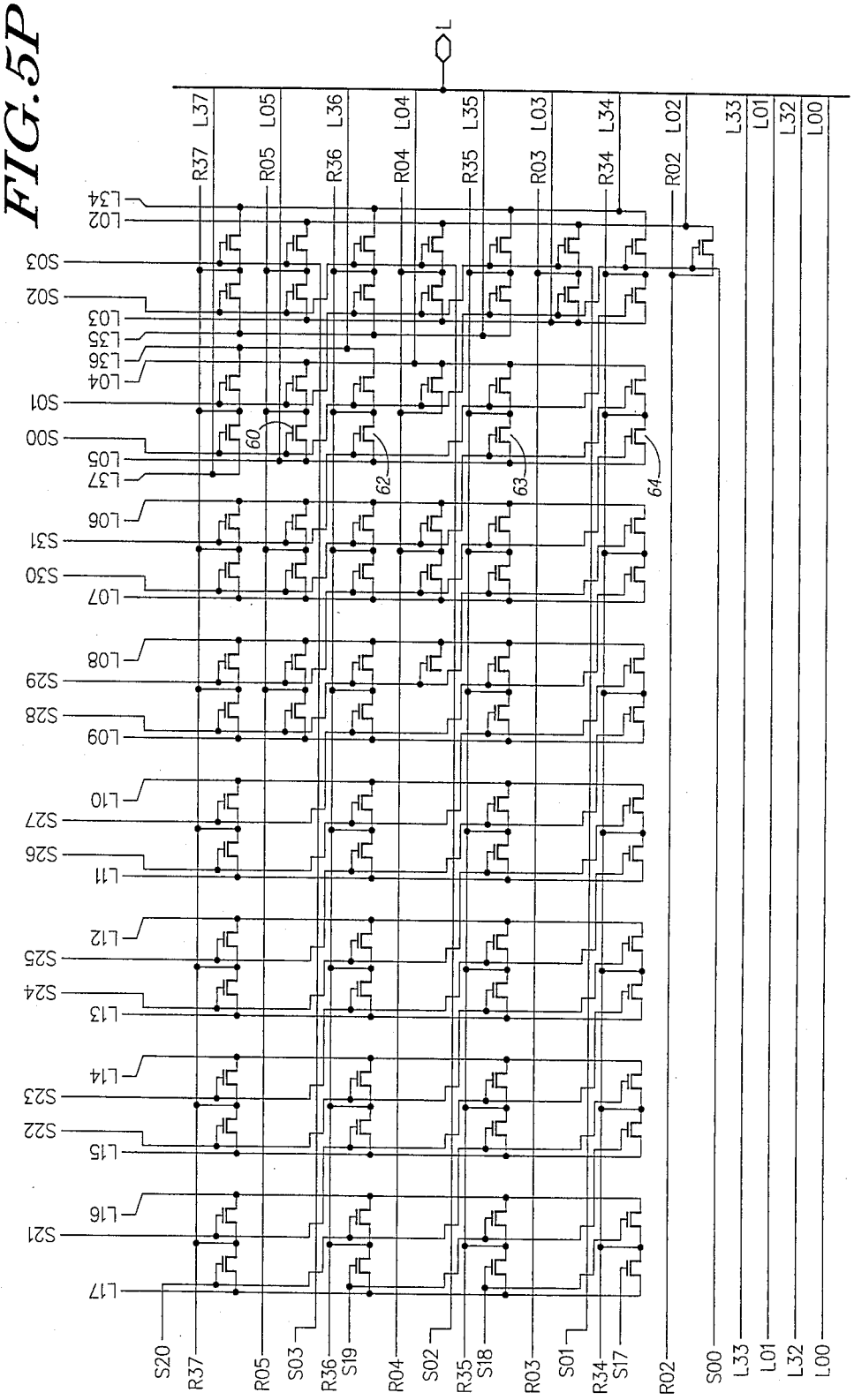
Figure 5Q:
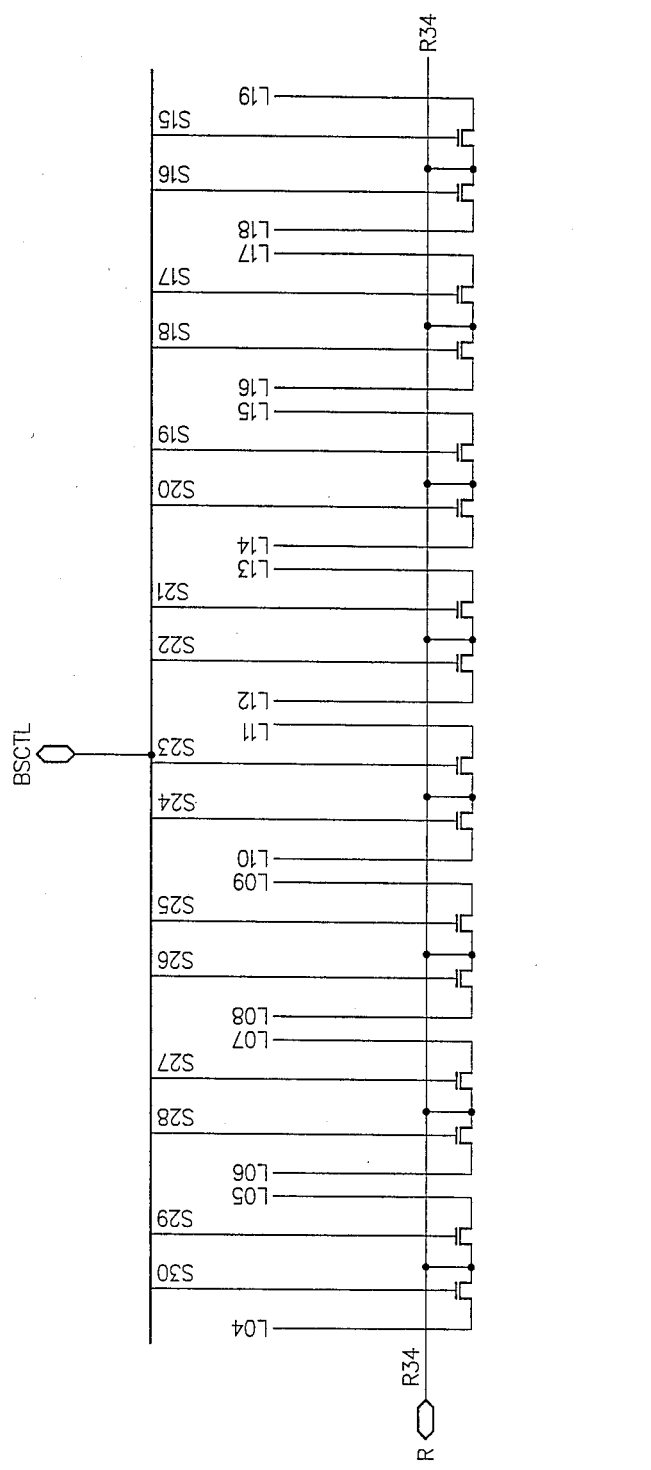
Figure 5R:
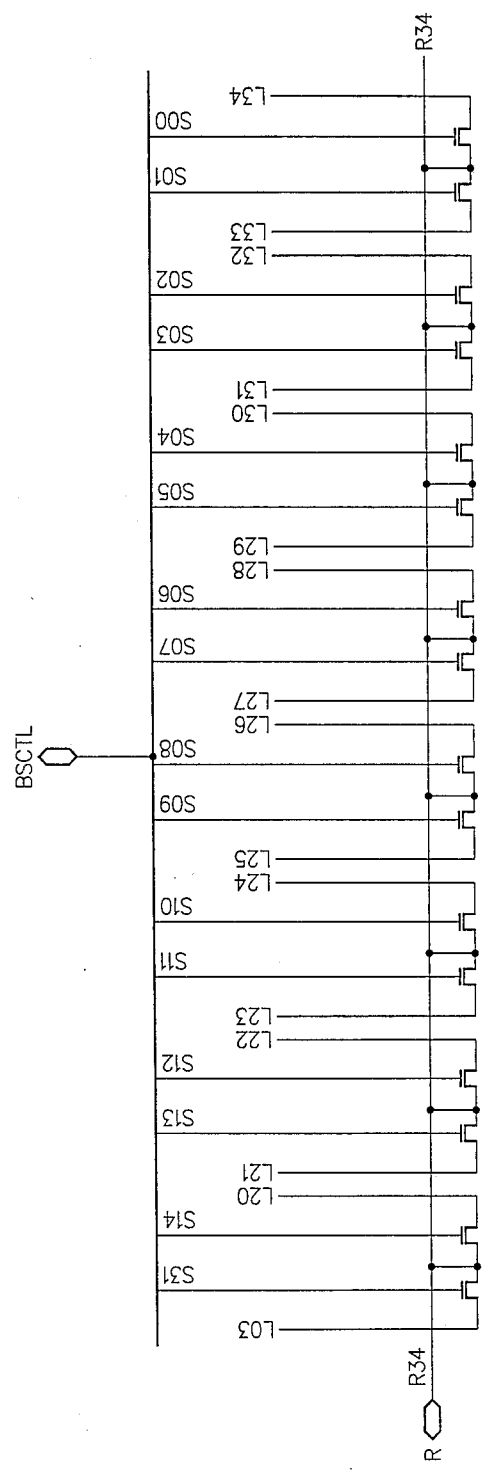

FIGS. 5A-5R are detailed schematic diagrams illustrating the electrical structure of functional blocks 40-57, respectively, of FIG. 3. FIGS. 5A-5P illustrate the "normal" portion of shift array 10. That is, the apparatus illustrated in FIGS. 5A-5P provides all of the interconnections between bit lines R00-R66 and bit lines L00-L66 which are necessary to implement shift functions S00-S31, S64, S65 and S66. The apparatus illustrated in FIGS. 5Q and 5R correspond to functional blocks 56 and 57, respectively, of FIG. 4 and illustrate the "extra" portions of shift array 10. That is, the apparatus illustrated in FIGS. 5Q and 5R duplicate bit line R34 and its interconnections in order to speed up certain shift operations.

A detailed description of each bit line, shift count line and switchable interconnection of FIGS. 5A-5P would, obviously, be prohibitively lengthy. Instead, some general comments regarding the required interconnections and some specific examples with reference to the drawings will suffice to inform one skilled in the art.

Consider, for instance, the required interconnections for bit line L05. Bit line L05 is the source of the fifth bit of the input word on left shifts and is the destination for various bits on right shifts. For left shifts, L05 must be connectable to each of R05-R36 (for shifts of S00-S31, respectively). Because there is no wrapping, L05 has no valid destinations for left shifts of S64, S65 and S66. The remaining left shifts (32-61 bits) for which L05 has valid destinations are accounted for by appropriate switching of bit lines R05-R29 to high rather than low destinations on BBUS in RSTMP 12. For right shifts, as will be apparent, nearly the same set of switchable interconnections suffices. For right shifts of S00-S31, the interconnections to bit lines R05-R36 are sufficient. L05 is not a valid destination for right shifts of S64, S65 or S66. Right shifts of 32-61 bits are accomodated by shifts of S00-S29 which connect bit lines R37-R66, respectively, to bit line L37. Then, in LSTMP 11, a low destination is selected to couple L37 to bit line 05 of ABUS.

That the above-mentioned interconnections actually exist can be confirmed with reference to FIGS. 5A-5P. Bit line L05 appears at its connection to L bus 16 in FIG. 5P. As shown therein, bit line L05 is coupled to a source of an FET switch 60, which also has a drain coupled to bit line R05 and a gate coupled to shift control line S00. This, of course, provides the necessary switchable interconnection for both left and right shifts of S00. Similarly, also in FIG. 5P, FET switches 62, 63 and 64, which have gates coupled to shift control lines S31, S30 and S29, respectively, provide the necessary interconnections to bit lines R36, R35 and R34, respectively.

Following bit line L05 off the top of FIG. 5P and onto the bottom of FIG. 5N, one finds L05 coupled to the sources of FET switches 65, 66, 67 and 68. The drains of these FET switches are coupled, respectively, to bit lines R06, R07, R08 and R09. The gates of these FET switches are coupled, respectively, to shift control lines S01, S02, S03 and S04.

Following bit line L05 from FIG. 5N to FIG. 5L, one finds L05 coupled to the sources of FET switches 69, 70, 71 and 72. These switches have drains coupled, respectively, to bit lines R10, R11, R12 and R13. These FET switches have gates coupled, respectively, to shift control lines S05, S06, S07 and S08.

Following this pattern, one can trace bit line L05 through FIGS. 5J, 5H, 5F, 5D and 5B as its interconnections to various bit lines from R bus 17 are controlled by FET switches 73-92.

The interconnections described up to this point accomplish all of the left shifts and the right shifts of less than 32 bits. As described above, the interconnections to bit line L37 must be traced to verify the ability to accomplish right shifts greater than 31 bits. Since bit line L37 exits L bus 16 in FIG. 5P immediately adjacent to bit line L05, as one would expect, and remains adjacent thereto throughout FIGS. 5N, 5L, 5J, 5H, 5F, 5D and 5B, these interconnections are relatively easy to verify.

All of the necessary interconnections in the "normal" portion of shift array 10 follow the basic pattern set forth above, except for the interconnections for S64, S65 and S66. These appear in the upper left portion of FIG. 5A and the upper right portion of FIG. 5B. For S66, a single switchable interconnections between R66 and L00 serves both left and right shifts. This interconnection is provided by FET switch 93 (FIG. 5A). For S65, switchable interconnections between R66 and L01 and between R65 and L00 suffice. These are provided, respectively, by FET switches 94 and 95 (FIG. 5A). For S64, switchable interconnections between R66 and L02, between R65 and L01 and between R64 and L00 are adequate. These are provided, respectively, by FET switches 96 (FIG. 5B), 97 and 98 (FIG. 5A).

The general layout of shift array 10 is as follows. Each bit line of R bus 17 extends across the width of array 10 and stops just short of L bus 16. The exception is R34, which also extends vertically along the R bus side of the array to the top, as will be more apparent from the description of FIGS. 5Q and 5R. Each bit line of L bus 16 extends all or part way across the width of the array twoard R bus 17, then extends upward to the top of the array.

As mentioned above, bit line R34 is the exception to the general comments regarding layout. As is illustrated in FIG. 5O, R34 also extends vertically along the side of the array next to R bus 17. The purpose of this arrangement is to facilitate the duplication of the R34 interconnections at the top of the array.

FIGS. 5Q and 5R illustrate the duplicated R34 interconnections mentioned above. The arrangement of elements in these FIGS. does not correspond directly to any particular physical layout of the shift array. For right shifts, in which R34 is a source bit line, valid destinations include L34 through L03 (right shifts of S00-S31, respectively). These same interconnections suffice to enable all required left shifts. As is apparent, the apparatus illustrated in FIGS. 5Q and 5R is a straightforward implementation of these necessary interconnections. By reference to FIGS. 5O and 5P, the "normal" interconnections to bit line R34 may be traced. The significant saving of path length through the array by duplicating these interconnections will be immediately apparent.

In the preferred embodiment of the invention, the vertical runs of the various bit lines are implemented in poly-silicide, a material which is somewhat more resistive than metal. This added resistive load, which contributes to an RC delay factor, contributes a large factor to the time required to resolve the worst case shifts. Thus, the need to duplicate bit line R34 to eliminate the longest of these vertical runs.

In addition to the duplication of bit line R34, the input-output interfaces LSTMP 11 and RSTMP 12 must be properly implemented to provide all of the necessary functions. FIGS. 6A–6D illustrate the detailed features of LSTMP 11 and FIGS. 7A–7D illustrate the detailed features of RSTMP 12.

Figure 6A:
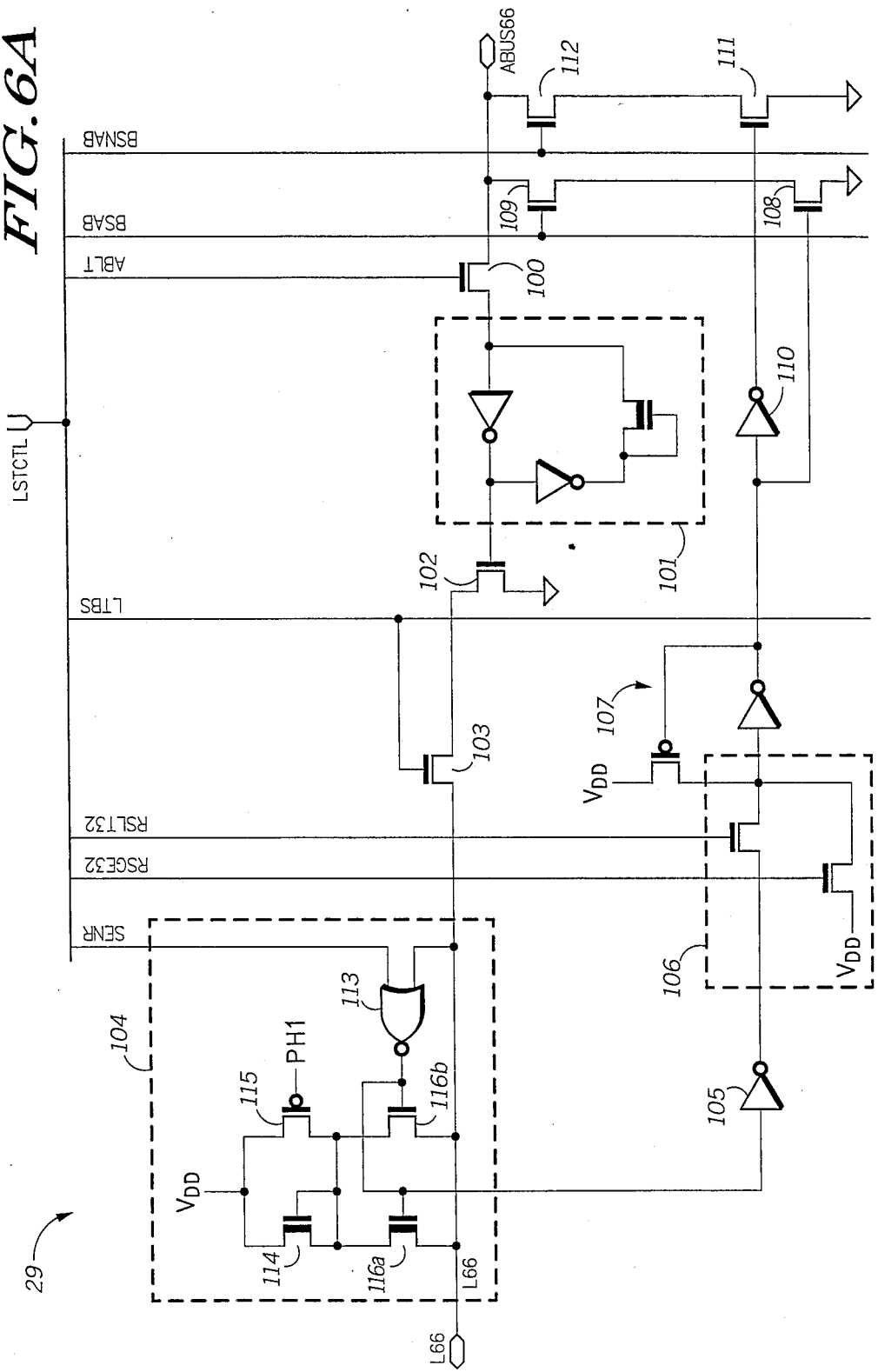

FIG. 6A illustrates the electrical structure of functional block 29 of FIG. 2, which is referred to therein as LSHT66. The purpose of this functional unit is to provide interface from ABUS66 to L66 on left shifts and to provide sensing and output interfacing between L66 and ABUS66 on right shifts. The circuit will be described in some detail because the basic elements thereof are repeated for each bit line in LSTMP 11 and RSTMP 12. It is important to note that the signals on ABUS, BBUS, L bus 16, R bus 17 and internal to the shift array are all low-active. The circuit is responsive to seven control signals from LSTCTL 14. These are SENR, RSGE32, RSLT32, LTBS, ABLT, BSAB and BSNAB. SENR is a signal which is low-active and which enables the sense function of circuit 29 on right shifts, as will be more apparent from the description below. RSGE32 indicates that a right shift of greater than or equal to 32 is in progress, while RSLT32 indicates that a right shift of less than 32 is in progress. LTBS enables transfer of data from LSTMP 11 to to shift array 10 on left shifts. ABLT similarly enables transfer of data from ABUS to LSTMP 11 on left shifts. BSAB enables transfer of data from LSTMP 11 to ABUS on right shifts. BSNAB enables transfer of negated (inverted) data from LSTMP 11 to ABUS on right shifts and is used to implement the one's fill, sign extend function.

The input interface circuits of LSHT66 29 comprise a first FET switch 100, a latch 101, a discharge FET 102 and a second FET switch 103. First FET switch 100 has a source coupled to ABUS66, a drain coupled to the input of latch 101 and a gate coupled to control signal ABLT. On left shifts, both ABLT and LTBS are active, so that FET switches 100 and 103, respectively, are closed. A low-active signal on ABUS66 is inverted by latch 101 and the resulting high active signal is applied to the gate of discharge FET 102. This closes FET 102 and discharges bit line L66, thus rendering the signal thereon active. Of course, if the signal on ABUS66 is high, or not active, then discharge FET 102 is not closed and L66 remains at its previous level.

The output interface portions of LSHT66 29 comprise a self-biased sense amplifier 104, the output of which is coupled to a first inverter 105, the output of which is coupled to a high/low destination select circuit 106, the output of which is coupled to a second inverter and driver 107. The output of inverter and driver 107 is coupled to a gate of a discharge FET 108, whose output is coupled through FET switch 109 to ABUS66. The output of inverter and driver 107 is also coupled to a third inverter 110, whose output is coupled to the gate of a discharge FET 111, whose output is coupled through FET switch 112 to ABUS66.

Self-biased sense amplifier 104 contributes greatly to the speed of operation of this barrel shifter. It comprises a NOR gate 113 having inputs coupled to L66 and to control signal SENR, a first depletion-mode FET 114, a first enhancement-mode FET 115 and a depletion-mode/enhancement-mode FET pair 116a and 116b, respectively. First depletion-mode FET 114 serves to constantly replenish any leaked current so as to maintain bit line L66 at a logic high (inactive) level. This replenishment current is very small and is passed through depletion-mode FET 116a, which is normally at least slightly conductive. Enhancement-mode FET 115 is triggered when the clock signal PH1, which is connected to its gate, is low (inactive) to supply $V_{DD}$ to FET pair 116a and 116b. SENR is low (active) during the pre-charge period preceding a shift and remains active during right shifts. This allows the output of NOR gate 113 to activate FET pair 116a and 116b (if L66 is also low) to act as an active, self-biased feedback circuit to charge L66 to a level several tens or hundreds of millivolts above the switchpoint of NOR gate 113, at which point the pre-charging is stopped. It should be noted that both sides of the array are pre-charged (there are also self-biased sense amplifiers in RSTMP 12) immediately prior to a shift. The inactivation of either SENR or SENL serves to stop the pre-charging on the input side of the array when the shift is executed.

On right shifts, SENR is active (low) to enable NOR gate 113. If L66 is then low, a logic high output is provided to inverter 105, which converts the signal back to low-active. High/low destination select circuit 106 normally selects which of two signals should be transferred to the appropriate line of ABUS. On shifts of less than 32, the output of inverter 105 is passed on, as determined by RSLT32. On shifts of 32 or greater, the output of a high order bit line is passed on, as determined by RSGE32. However, in the case of L66, no right shifts of 32 or greater have a valid destination of ABUS66, so $V_{DD}$ (indicating an inactive signal) is passed on when RSGE32 is active.

The output of circuit 106 is coupled to inverter and driver 107, which is a level-shifting inverter whose switch point is adjusted for sensing logic high levels at high speeds. This output signal is coupled to the gate of discharge FET 108. If L66 was active (low) and if RSLT32 was active, then discharge FET 108 will be on and, assuming BSAB is active, this will discharge ABUS66, thereby placing an active (low) signal thereon. If L66 was not active, or if RSGE32 was active, then FET 108 will not be on and ABUS66 will remain at its previous level.

The sign extend function of this barrel shifter allows, on right shifts when input bit 66 is one, the filling of the most significant bits of the output with ones instead of zeroes. In this case, control signal BSNAB is active instead of BSAB. Thus, the output of inverter and driver 107 is coupled through inverter 110 to the gate of discharge FET 111, which transfers inverted data to ABUS66 through FET switch 112.

The basic input/output interfacing functions described above and the circuits used to implement them are substantially the same throughout LSTMP 11. The only major difference is in high/low destination circuit 105, as will be explained below. For the sake of brevity, the details described with reference to FIG. 6A will not be repeated when discussing the following FIGS.

Figure 6B:
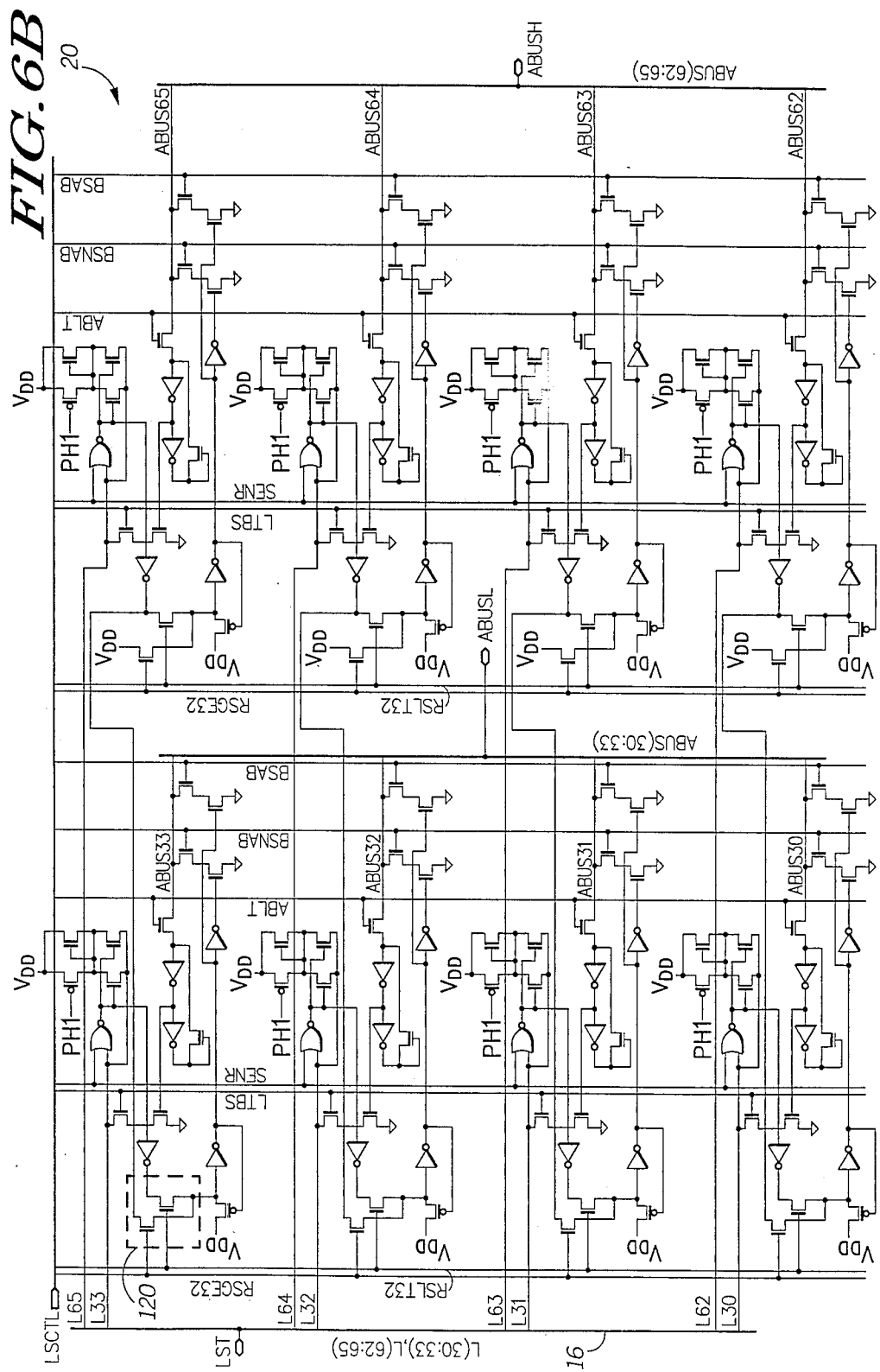

FIG. 6B is a detailed illustration of the electrical structure of functional block 20 of LSTMP 11 (FIG. 2). Functional blocks 21, 22, 23, 24, 25 and 26 are structurally identical to functional block 20, but provide interface between different lines of L bus 16 and ABUS. Functional block 20 provides input/output interface between bit lines L30, L62, L31, L63, L32, L64, L33 and L65 and the corresponding bit lines of ABUS. The details of that interface are identical to those described above for LSHT66 except for the high/low destination select circuits, an example of which is circuit 120. Circuit 120 selects which of two data lines are to be coupled to bit line ABUS33. As is apparent, if RSLT32 is active, the sensed output of bit line L33 is coupled to ABUS33. If, however, LSGE32 is active, the sensed output of bit line L65 is coupled to ABUS33. Of course, this latter case simply implements a right shift of 32 places by means of the high/low destination selection. Because only bit lines ABUS34–ABUS00 are valid destinations for right shifts of 32, only those lines have a high/low destination select circuit like 120 coupled thereto. Others, for instance ABUS65 of FIG. 6B, have a circuit like 106 (FIG. 6A) coupled thereto.

FIG. 6C illustrates functional block 27 (LSIT37) of FIG. 2. LSIT37 27 provides input/output interface between bit lines L34, L02, L35, L03, L36, L04, L37 and L05 and the corresponding bit lines of ABUS and performs its functions in the same manner as decribed above, with one exception. As is apparent from FIG. 1A, a right shift of 32 or greater will require some shifts of 32 to be accomplished within LSTMP 11 between two lines which are not adjacent. One such shift is required when the sensed output of L66 must be routed to ABUS34 (which occurs only on a right shift of exactly 32). To provide this function within LSIT37 27, a circuit 121 is provided to sense the level on L66 and provide that output to high/low destination select circuit 122 for coupling to ABUS34. Note that the pre-charge portions of the other sense amplifiers are left out of circuit 121. This is because L66 is pre-charged by the sense amplifier in LSHT66 29 (FIG. 6A).

Figure 6D:
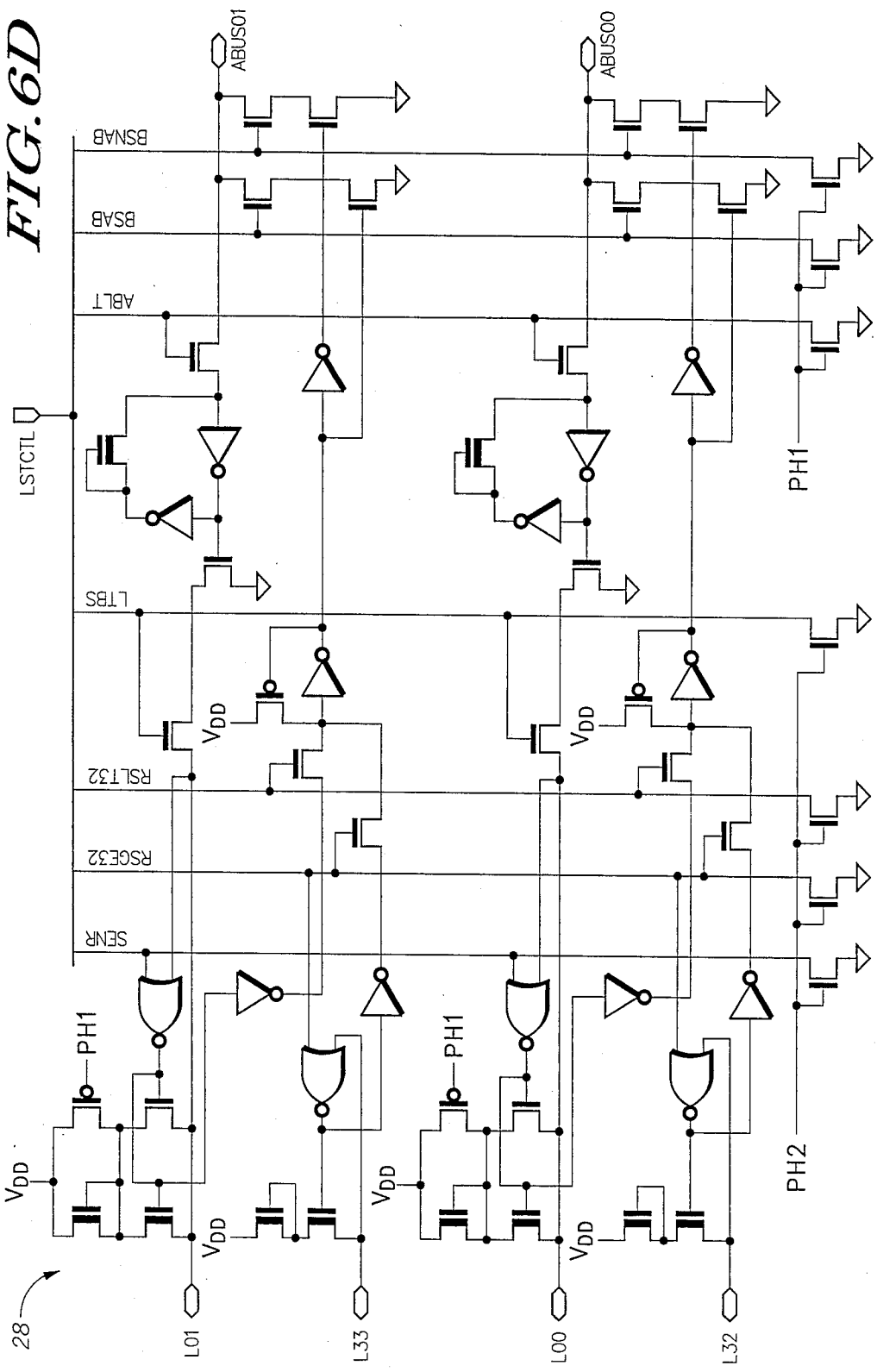

FIG. 6D illustrates in detail the electrical structure of functional block 28 (LSJT1_0) of FIG. 2. This circuit provides input/output interfacing between bit lines L00, L01, L32 and L33 and bit lines 00 and 01 of ABUS. The interfacing between L00 and ABUS00 and between L01 and ABUS01 is identical to that described above for the other lines. The provision for interface to bit lines L32 and L33 is, once again, to account for 32-bit shifts between non-adjacent lines. On right shifts of 32 or greater, the output of L33 must be routed to ABUS01 and the output of L32 must be routed to ABUS00. In each case, the implementation of this function is identical to that described with reference to circuit 121 in FIG. 6C. In addition, FIG. 6D illustrates that each of the control lines which appear in LSTMP 11 are terminated with clocked discharge FETs.

FIGS. 7A–7D are detailed illustrations of the electrical structures of functional blocks 39, 38, 30 and 37, respectively, of FIG. 3. For the most part, the details of the input/output interfacing between R bus 17 and BBUS which is provided by these portions of RSTMP 12 are identical to those discussed above with reference to FIGS. 6A–6D. These details will not be repeated here. However, some specifics differ between LSTMP 11 and RSTMP 12. For instance, no sign extend function is available on left shifts, so there is no analog to control signal BSNAB and its associated circuits in RSTMP 12. On the other hand, accomodation must be made for the sign extend function on the input side of the interface in RSTMP 12 to account for the extra data inversion which occurs in LSTMP 11 on the output side.

The control signals from RSTCTL 15 to which RSTMP 12 responds are SENL, LSGE32, LSLT32, RTNBS, RTBS, BBRT and BSBB. SENL is a low-active signal which enables the sense amplifiers of RSTMP 12 on left shifts. LSGE32 indicates left shifts of 32 bits or greater and LSLT32 indicates left shifts of less than 32 bits. RTNBS indicates that the data of BBUS should be inverted and transferred to the shift array and is used on sign extend operations. RTBS indicates that the data should be transferred to the shift array without inversion. BBRT enables transfer of data from BBUS to RSTMP 12. BSBB enables transfer of data from RSTMP 12 to BBUS. As is apparent, these control signals are mostly analogous to those of LSTCTL 14 except that BSNAB, which controls output from LSTMP to ABUS has been transformed into RTNBS, which controls input from BBUS to the shift array.

Figure 7A:
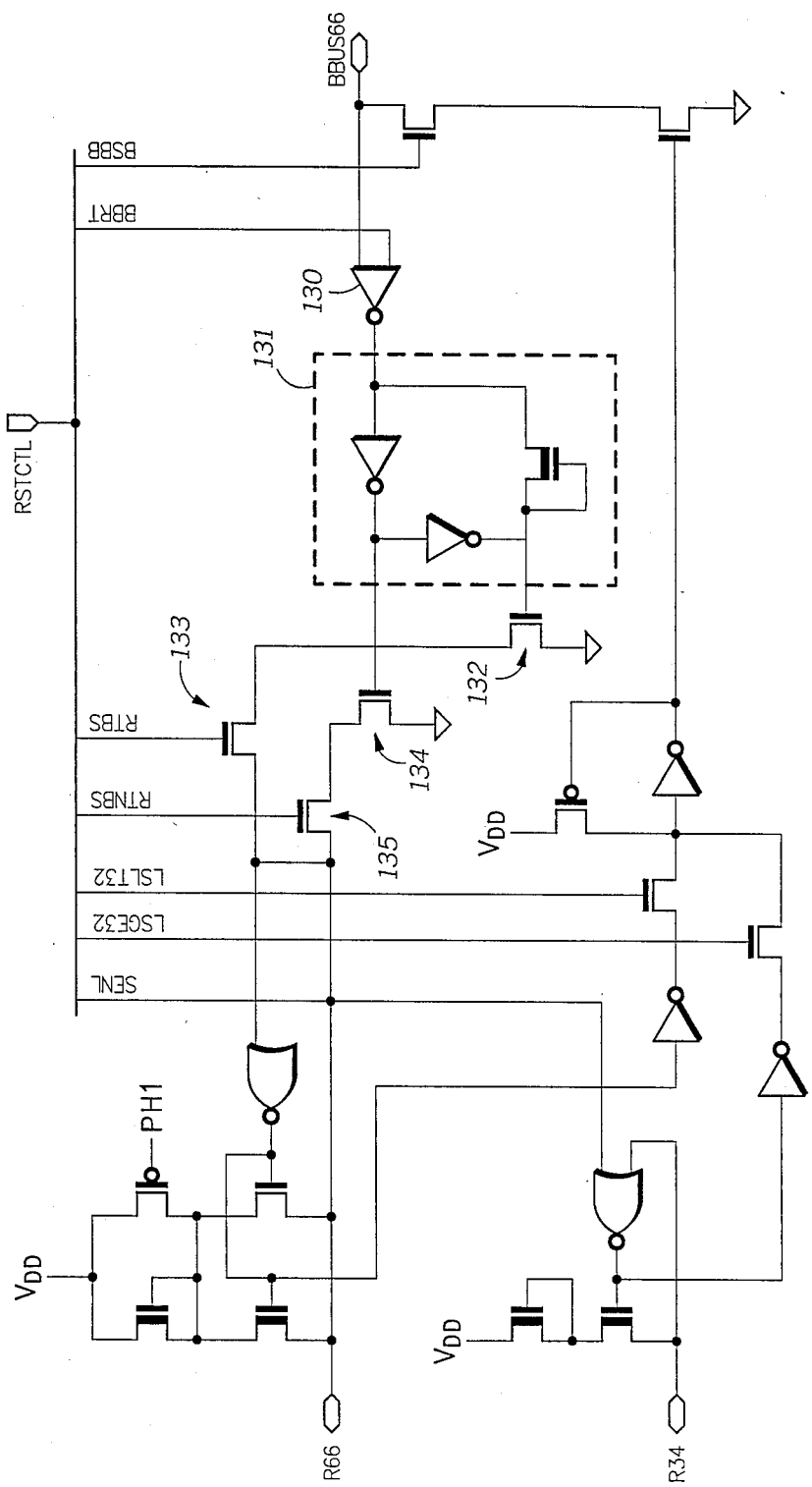

FIG. 7A is the analog of FIG. 6A and provides input/output interfacing between R66 and BBUS66. An important difference is that BBUS66 is a valid destination for left shifts of 32 or more places, so the high/low destination select circuit must be used and the sensed output of R34 must be made available thereto. Note that, as was described above, R34 has a self-biased sense amplifier elsewhere in RSTMP 12, so the sense amplifier used in the circuit of FIG. 39 does not have the pre-charging portions.

The input interface between BBUS66 and R66 in FIG. 7A is significantly different from its analog in FIG. 6A, and so bears a detailed description. BBUS 66 is coupled to the input of a clocked inverter 130, which has its clock input coupled to control signal BBRT. The output of clocked inverter 130 is coupled to the input of latch 131. A twice-inverted output of latch 131 is coupled to the gate of discharge FET 132, whose output is coupled throgh FET switch 133 to R66. The signal coupled to the gate of discharge FET 132 has undergone three inversions from BBUS66, and so is active-high. Thus, this is analogous to the signal coupled to the gate of discharge FET 102 of FIG. 6A. A once-inverted output of latch 131 is coupled to the gate of a discharge FET 134, whose output is coupled through FET switch 135 to R66. As is apparent, this input interface scheme transfers data without net inversion from BBUS66 to R66 when BBRT and RTBS are active and transfers the data with a net inversion when BBRT and RTNBS are active. As described above, this implementation accounts for the extra inversion present at the output interface when the sign extend function is invoked. This input interface scheme is used throughout RSTMP 12.

Figure 7B:
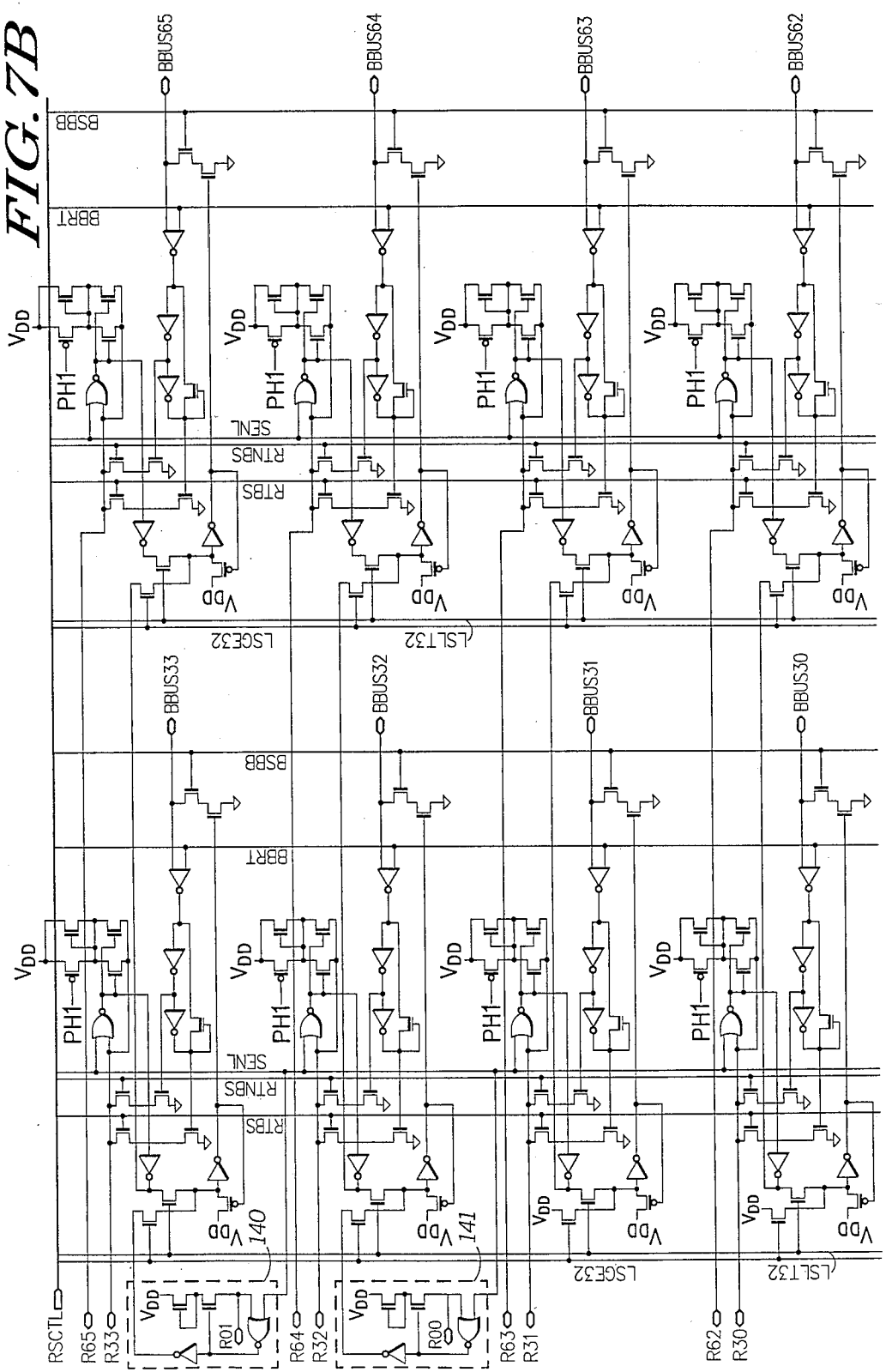

FIG. 7B illustrates the detailed electrical structure of functional block 38 (GRST65) of FIG. 3. This circuit provides input/output interfacing between bit lines R30, R31, R32, R33, R62, R63, R64 and R65 and the corresponding bit lines of BBUS. In addition, in order to implement 32 bit shifts between non-adjacent lines, circuits 140 and 141 are provided. These circuits provide sensing (without pre-charging) of bit lines R01 and R00, respectively, and provide the outputs to the hig/low destination select circuits coupled to bit lines BBUS33 and BBUS32, respectively.

Figure 7C:
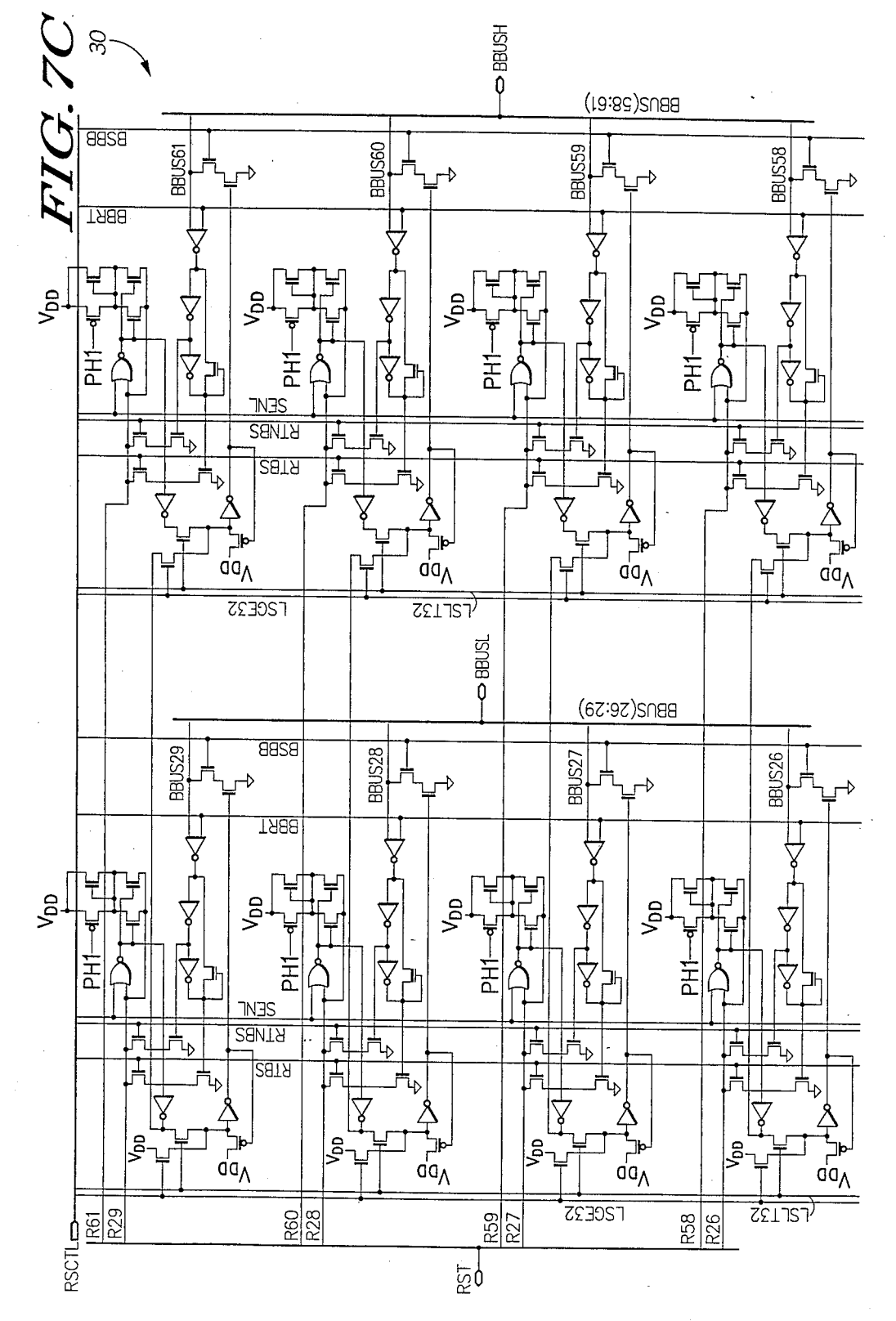

FIG. 7C illustrates the electrical structure of functional block 30 (RST4) of FIG. 3. Functional block 30 provides input/output interfacing between bit lines R26 R27, R28, R29, R58, R59, R60 and R61 and the corresponding bit lines of BBUS. RST4 30 is the analog of LST4 (FIG. 6B) and uses the input/output interface scheme described above with reference to FIG. 7A.

Figure 7D:
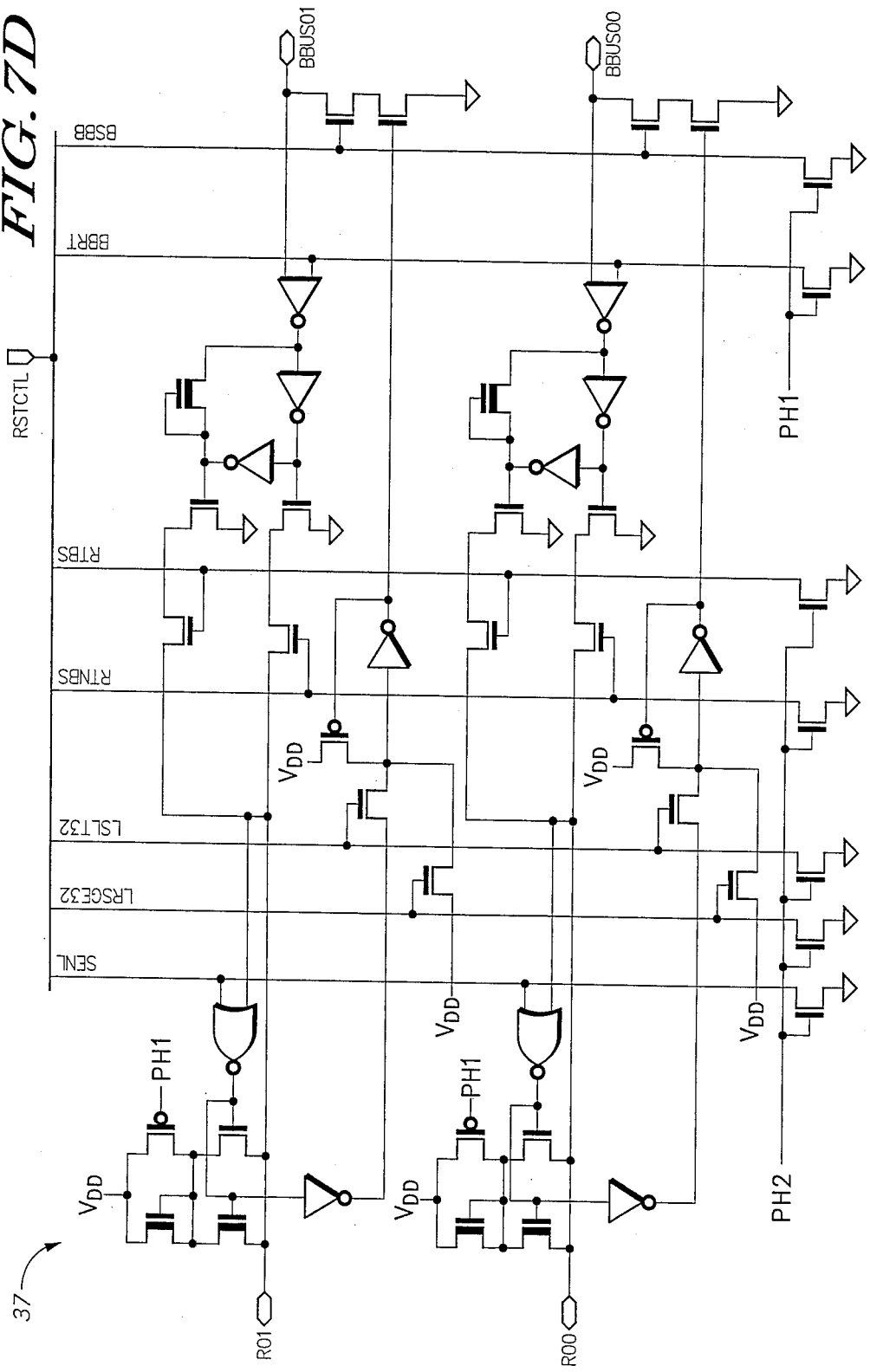

FIG. 7D illustrates the detailed electrical structure of functional block 37 (IRST0_1) of FIG. 3. Block 37 provides input/output interfacing between bit lines R00 and R01 and the corresponding bit lines of BBUS. The interface scheme used is identical to that described above with reference to FIG. 7A.

One modification which is possible to the described embodiment is the addtion of a "wrap-around" or rotation function. This would provide that a bit which is right-shifted from R00 would appear on L66, or some other appropriate bit line depending on the shift count. As will be apprent to one skilled in the art from an examination of FIGS. 5A–5P, exactly one-half of the possible switchable interconnections are provided in the described embodiment. This is a result of the fact that no rotation function is provided. The addition of the other possible FET switches would provide a rotation function. In addition, the described high/low destination select circuits which are described in LSTMP 11 and RSTMP 12 would require some changes. Specifically, those circuits which have one input connected to $V_{DD}$ because of the lack of a valid destination would be connected, instead, to a bit line.

Up to this point, an improved barrel shifter has been described in detail with reference to a particular embodiment thereof. The disclosed barrel shifter is capable of performing large-count shifts on large data words very rapidly because of a unique shift array design which duplicates certain bit line interconnections to shorten critical paths through the array. In addition, a self-biased sense amplifier concept is utilized which shortens the total shift cycle. While the invention has been described with reference to a particular embodiment thereof, various modifications and changes thereto will be apparent to one skilled in the art and are within the spirit and scope of the present invention.

We claim:

1. A barrel shifter comprising a first plurality of bit lines, a second plurality of bit lines and shift means for selectably providing interconnections between bit lines of said first plurality thereof and bit lines of said second plurality thereof to produce a set of desired shifts, said set of desired shifts including every shift of which said barrel shifter is capable, wherein the improvement comprises:
   said shift means further comprises first means for producing each of said set of desired shifts and second means for producing at least one of said set of desired shifts, said second means duplicating at least a portion of said first means.

2. A barrel shifter according to claim 1 wherein the improvement further comprises:
   sense amplifier means coupled to each of said first and second plurality of bit lines for sensing voltage transitions thereon.

3. A barrel shifter according to claim 1 wherein said first and second plurality of bit lines each further comprises:
   a plurality of high-order bit lines; and
   a plurality of low-order bit lines, said high- and low-order bit lines being interleaved.

4. A barrel shifter according to claim 3 further comprising:
   first input/output interface means for interfacing between said first plurality of bit lines and a first data bus; and
   second input/output interface means for interfacing between said second plurality of bit lines and a second data bus.

5. A barrel shifter according to claim 4 wherein each said first and second input/output interface means further comprises:
   means for accomplishing at least one shift in addition to said set of desired shifts.

6. A barrel shifter comprising a first plurality of bit lines, a second plurality of bit lines, a plurality of interconnections between bit lines of said first plurality thereof and bit lines of said second plurality thereof and shift means for activating selected ones of said plurality of interconnections to provide a set of desired shifts, said set of desired shifts including every shift of which said barrel shifter is capable, wherein the improvement comprises:
   at least one of said bit lines and each of said interconnections thereto being duplicated.

7. A barrel shifter according to claim 6 wherein the improvement further comprises:
   sense amplifier means coupled to each of said first a second plurality of bit lines for sensing voltage transitions thereon.

8. A barrel shifter according to claim 6 wherein said first and second plurality of bit lines each further comprises:
   a plurality of high-order bit lines; and
   a plurality of low-order bit lines, said high- and low-order bit lines being interleaved.

9. A barrel shifter according to claim 6 further comprising:
   first input/output interface means for interfacing between said first plurality of bit lines and a first data bus; and
   second input/output interface means for interfacing between said second plurality of bit lines and a second data bus.

10. A barrel shifter according to claim 9 wherein each said first and second input/output interface further comprises:
    means for accomplishing at least one shift in addition to said set of desired shifts.

11. A barrel shifter comprising:
    first interface means for accepting input from and providing output to a first data bus;
    a second data bus comprising a plurality of bit lines coupled to said first interface means;
    second interface means for accepting input from and providing output to a third data bus;
    a fourth data bus comprising a plurality of bit lines coupled to said second interface means;
    a first plurality of interconnections between said bit lines of said second data bus and said bit lines of said fourth data bus;
    a second plurality of interconnections between at least one bit line of said second data bus and at least one bit line of said fourth data bus, said second plurality of interconnections duplicating a portion of said first plurality of interconnections; and
    shift means coupled to said first and second plurality of interconnections for activating selected ones of said first and second plurality of interconnections to accomplish a set of desired shifts, said set of desired shifts including every shift of which said barrel shifter is capable, said first plurality of interconnections being sufficient to accomplish each of said set of desired shifts.

12. A barrel shifter according to claim 11 further comprising:
    sense amplifier means coupled to each bit line of said second and fourth data buses for sensing voltage transitions thereon.

13. A barrel shifter according to claim 11 wherein said second and fourth data buses each further comprise:

a plurality of high-order bit lines; and
a plurality of low-order bit lines, said high- and low-order bit lines being interleaved.

14. A barrel shifter according to claim 11 wherein each of said first and second interface means further comprises:
means for accomplishing at least one shift in addition to said set of desired shifts.

* * * * *